US010375739B2

(12) United States Patent
Einhaus et al.

(10) Patent No.: US 10,375,739 B2
(45) Date of Patent: Aug. 6, 2019

(54) RANDOM ACCESS PROCEDURE FOR UNLICENSED CELLS

(71) Applicant: Panasonic Intellectual Property Corporation of America, Torrance, CA (US)

(72) Inventors: Michael Einhaus, Darmstadt (DE); Joachim Loehr, Hessen (DE); Hidetoshi Suzuki, Kanagawa (JP); Li Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/755,048

(22) PCT Filed: Aug. 26, 2015

(86) PCT No.: PCT/CN2015/088173
§ 371 (c)(1),
(2) Date: Feb. 23, 2018

(87) PCT Pub. No.: WO2017/031725
PCT Pub. Date: Mar. 2, 2017

(65) Prior Publication Data
US 2018/0255586 A1 Sep. 6, 2018

(51) Int. Cl.
*H04L 5/00* (2006.01)
*H04W 72/02* (2009.01)
(Continued)

(52) U.S. Cl.
CPC .......... *H04W 74/0833* (2013.01); *H04L 5/00* (2013.01); *H04W 72/02* (2013.01);
(Continued)

(58) Field of Classification Search
CPC ......... H04W 74/0833; H04W 72/0446; H04W 74/002; H04W 74/08; H04L 27/2616
See application file for complete search history.

(56) References Cited

U.S. PATENT DOCUMENTS 9,271,309 B2 2/2016 Kim et al.
9,603,048 B2 3/2017 Pelletier et al.
(Continued)

FOREIGN PATENT DOCUMENTS

CN 1981482 A 6/2007
CN 102792757 A 11/2012
(Continued)

OTHER PUBLICATIONS

Extended European Search Report, dated Feb. 25, 2019, for corresponding European Application No. 15901996.7-1215 / 3342238, 9 pages.
(Continued)

*Primary Examiner* — Chandrahas B Patel
(74) *Attorney, Agent, or Firm* — Seed IP Law Group LLP

(57) ABSTRACT

The disclosure relates to a method for performing a random access procedure between a user equipment and a radio base station. The UE is configured with at least one unlicensed cell having an unlicensed cell frequency, via which the UE performs the random access procedure bandwidth. A minimum frequency bandwidth threshold is defined for transmissions via the unlicensed cell. The user equipment selects a random access preamble sequence for the random access procedure. A frequency bandwidth is determined by the UE for transmitting the random access preamble sequence via the unlicensed cell, the determined frequency bandwidth of the random access preamble sequence being at least the minimum frequency bandwidth threshold. The UE then transmits the random access preamble sequence to the radio
(Continued)

base station such that at least the determined frequency bandwidth of the unlicensed cell is occupied.

20 Claims, 15 Drawing Sheets

(51) Int. Cl.

| | |
|---|---|
| ***H04W 72/04*** | (2009.01) |
| ***H04W 74/00*** | (2009.01) |
| ***H04W 74/08*** | (2009.01) |
| *H04W 16/14* | (2009.01) |

(52) U.S. Cl.

CPC ... *H04W 72/0413* (2013.01); *H04W 72/0453* (2013.01); *H04W 74/008* (2013.01); *H04W 16/14* (2013.01)

(56) References Cited

U.S. PATENT DOCUMENTS

| | | | | |
|---|---|---|---|---|
| 9,980,283 | B2 * | 5/2018 | Li | H04L 27/2613 |
| 2011/0194542 | A1 | 8/2011 | Kim et al. | |
| 2013/0089075 | A1 | 4/2013 | Lim | |
| 2013/0242730 | A1 | 9/2013 | Pelletier et al. | |
| 2013/0343341 | A1 | 12/2013 | Kim et al. | |
| 2014/0206279 | A1 | 7/2014 | Immendorf et al. | |
| 2016/0374079 | A1 | 12/2016 | Yasukawa et al. | |
| 2017/0135135 | A1 | 5/2017 | Pelletier et al. | |

FOREIGN PATENT DOCUMENTS

| | | | |
|---|---|---|---|
| CN | 104186010 | A | 12/2014 |
| JP | 2009-542040 | A | 11/2009 |
| JP | 2015-133643 | A | 7/2015 |
| WO | 2015/023909 | A2 | 2/2015 |
| WO | 2015/042594 | A2 | 3/2015 |
| WO | 2015/113226 | A1 | 8/2015 |

OTHER PUBLICATIONS

ZTE, "Overview on LAA UL," R1-152970, 3GPP TSG RAN WG1 Meeting #81, Agenda Item: 6.2.4.3, Fukuoka, Japan, May 25-29, 2015, 6 pages.

3GPP TR 36.889 V13.0.0, "3rd Generation Partnership Project; Technical Specification Group Radio Access Network; Study on Licensed-Assisted Access to Unlicensed Spectrum; (Release 13)," Jun. 2015, 87 pages.

3GPP TS 36.211 V12.6.0, "3rd Generation Partnership Project; Technical Specification Group Radio Access Network; Evolved Universal Terrestrial Radio Access (E-UTRA); Physical channels and modulation (Release 12)," Jun. 2015, 136 pages.

3GPP TS 36.321 V12.6.0, "3rd Generation Partnership Project; Technical Specification Group Radio Access Network; Evolved Universal Terrestrial Radio Access (E-UTRA); Medium Access Control (MAC) protocol specification (Release 12)," Jun. 2015, 77 pages.

Alcatel-Lucent et al., "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.

ETSI EN 301 893 V1.8.0, "Broadband Radio Access Networks (BRAN); 5 GHz high performance RLAN; Harmonized EN covering the essential requirements of article 3.2 of the R&TTE Directive," *Harmonized European Standard*, Jan. 2015, 93 pages.

International Search Report dated Apr. 28, 2016, corresponding to International Application No. PCT/CN2015/088173, 2 pages.

Notice of Reasons for Rejection, dated Mar. 5, 2019, for corresponding Japanese Application No. 2018-508204, 11 pages.

* cited by examiner

RANDOM ACCESS PROCEDURE FOR UNLICENSED CELLS

BACKGROUND

Technical Field

The present disclosure relates to methods for performing a random access procedure between a user equipment and a radio base station in a mobile communication system. The present disclosure is also providing the user equipment and a radio base station for participating in the method(s) described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade.

The work item (WI) specification on Long-Term Evolution (LTE) called Evolved UMTS Terrestrial Radio Access (UTRA) and evolved UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL}N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair". The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP).

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel. 8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, then n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmission(s) need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

Maximum five serving cells, including the PCell, can be configured at the moment for one UE.

The configuration and reconfiguration, as well as addition and removal, of component carriers can be performed by RRC. Activation and deactivation is done, e.g., via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel. 8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink. When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Random Access Procedure

A mobile terminal in LTE can only be scheduled for uplink transmission, if its uplink transmission is time synchronized so as to maintain orthogonality with uplink transmissions from other UEs. The Random Access (RACH) procedure plays an important role as an interface between non-synchronized mobile terminals (UEs) and the orthogonal transmission of the uplink radio access. Essentially, the Random Access procedure in LTE is used to achieve uplink time synchronization for a user equipment which either has not yet acquired or has lost its uplink synchronization. Once a user equipment has achieved uplink synchronization, the eNodeB can schedule uplink transmission resources for it.

PRACH transmission and detection also provides an estimation of the round-trip delay between the eNB and the UE. The design target regarding the PRACH signal shape for licensed band LTE operation was minimization of overhead and interference impact on parallel uplink transmissions from other UEs while providing at the same time sufficient round-trip delay estimation accuracy.

There is one more additional case where a user equipment performs a random access procedure, even though the user equipment is time-synchronized, namely when the user equipment uses the random access procedure in order to send a scheduling request, i.e., uplink buffer status report, to its eNodeB, in case it does not have any other uplink resource(s) allocated in which to send the scheduling request, e.g., dedicated scheduling request (D-SR) channel is not configured.

The following scenarios are therefore relevant for random access:

1. A user equipment in RRC_CONNECTED state, but not uplink-synchronized, wishing to send new uplink data or control information
2. A user equipment in RRC_CONNECTED state, but not uplink-synchronized, required to receive downlink data, and therefore to transmit corresponding HARQ feedback, i.e., ACK/NACK, in the uplink. This scenario is also referred to as Downlink data arrival
3. A user equipment in RRC_CONNECTED state, handing over from its current serving cell to a new target cell; in order to achieve uplink time-synchronization in the target cell, Random Access procedure is performed
4. For positioning purposes in RRC_CONNECTED state, when timing advance is needed
5. A transition from RRC_IDLE state to RRC CONNECTED, for example for initial access or tracking area updates
6. Recovering from radio link failure, i.e., RRC connection re-establishment LTE offers two types of random access procedures allowing the access to be either contention based (implying an inherent risk of collision) or contention-free. It should be noted that contention-based random access can be applied for all six scenarios listed above, whereas a contention-free random access procedure can only be applied for the downlink data arrival and handover scenario.

In the following the contention-based random access procedure is being described in more detail with respect to FIG. 3. A detailed description of the random access procedure can be also found in 3GPP TS 36.321, current version 12.6.0, section 5.1, incorporated herein by reference.

FIG. 3 shows the contention-based RACH procedure of LTE. This procedure consists of four "steps". First, the user equipment transmits 301 a random access preamble on the Physical Random Access Channel (PRACH) to the eNodeB. The preamble is selected by the user equipment from a set of available random access preambles reserved by eNodeB for contention-based access; $N_d$ is the number of signatures reserved by the eNodeB for contention-free RACH. In LTE, there are 64 preambles in total per cell which can be used for contention-free as well as contention-based random access. The set of contention-based preambles can be further subdivided into two groups, so that the UE's choice of preamble can carry one bit of information to indicate information relating to the amount of transmission resources needed for the first scheduled transmission, which is referred to as msg3 in TS 36.321 (see step 303 in FIG. 3). The system information broadcasted in the cell contains the information which signatures (preambles) are in each of the two subgroups as well as the meaning of each subgroup. The user equipment randomly selects one preamble from the subgroup corresponding to the size of transmission resource needed for the msg3-transmission (see later step 303). When selecting the appropriate size to indicate, the UE may additionally take into account the current downlink path-loss and the required transmission power for the step 303 message in order to avoid being granted resources for a message size that would need a transmission exceeding that which the UE's maximum power would allow.

After the eNodeB has detected a RACH preamble, it sends 302 a Random Access Response (RAR) message on the PDSCH (Physical Downlink Shared Channel), the corresponding DCI on the PDCCH being addressed to the (Random Access) RA-RNTI that identifies the time-frequency slot in which the preamble was detected. If multiple user equipments transmitted the same RACH preamble in the same PRACH resource, which is also referred to as collision, they would receive the same random access response.

The RAR message conveys the identity of the detected RACH preamble, a timing alignment command (TA command) for synchronization of subsequent uplink transmissions, an initial uplink resource assignment (grant) for the transmission of the first scheduled transmission (see step 303) and an assignment of a Temporary Cell Radio Network Temporary Identifier (T-CRNTI). This T-CRNTI is used by eNodeB in order to address the mobile(s) whose RACH preamble were detected until RACH procedure is finished, since the "real" identity of the mobile is at this point not yet known to the eNodeB.

Furthermore, the RAR message can also contain a so-called back-off indicator, which the eNodeB can set to instruct the user equipment to back off for a period of time before retrying a random access attempt. The user equipment monitors the PDCCH for reception of the random access response within a given time window, which is configured by the eNodeB. In case the user equipment does not receive a random access response within the configured time window, it retransmits the preamble at the next PRACH opportunity considering a potential back off period.

In response to the RAR message received from the eNodeB, the user equipment transmits 303 the first scheduled uplink transmission on the uplink resources assigned by the grant within the random access response. This scheduled uplink transmission conveys the actual random access procedure message like for example an RRC connection request, a tracking area update or a buffer status report. Furthermore, it includes either the C-RNTI for user equipments in RRC CONNECTED mode or the unique 48-bit user equipment identity if the user equipments are in RRC IDLE mode. In case of a preamble collision having occurred in step 301, i.e., multiple user equipments have sent the same preamble on the same PRACH resource, the colliding user equipments will receive the same T-CRNTI within the random access response and will also collide in the same uplink resources when transmitting 303 their scheduled transmission. This may result in interference such that no transmission from a colliding user equipment can be decoded at the eNodeB, and the user equipments will restart the random access procedure after having reached the maximum number of retransmission for their scheduled transmission. In case the scheduled transmission from one user equipment is successfully decoded by eNodeB, the contention remains unresolved for the other user equipments. For resolution of this type of contention, the eNodeB sends 304 a contention resolution message addressed to the C-RNTI or Temporary C-RNTI, and, in the latter case, echoes the 48-bit user equipment identity contained in the scheduled transmission of step 303. In case of collision followed by a successful decoding of the message sent in step 303, the HARQ feedback (ACK) is only transmitted by the user equipment which detects its own identity, either C-RNTI or unique user equipment ID. Other UEs understand that there was a collision at step 301 and can quickly exit the current RACH procedure and start another one.

FIG. 4 is illustrating the contention-free random access procedure introduced as of 3GPP LTE Rel. 8/9. In comparison with the contention-based random access procedure, the contention-free random access procedure is simplified. The eNodeB assigns 401 the user equipment a particular preamble to use for random access so that there is no risk of collisions (i.e., multiple user equipments do not transmit the same RACH preamble). Accordingly, the user equipment is sending 402 the preamble which was signaled by eNodeB in the uplink on a suitable PRACH resource. Since the case that multiple UEs are sending the same preamble is avoided for a contention-free random access, no contention resolution is necessary, for which reason step 304 of the contention-based procedure shown in FIG. 3 can be omitted. Essentially, a contention-free random access procedure is finished after having successfully received the random access response. In case of a missing random access response, the subsequent PRACH retransmissions are initiated autonomously by the UE itself.

When carrier aggregation is configured, the first three steps of the contention-based random access procedure occur on the PCell, while contention resolution (step 304) can be cross-scheduled by the PCell.

The initial preamble transmission power setting is based on an open-loop estimation with full compensation of the path loss. This is designed to ensure that the received power of the preambles is independent of the path-loss.

The eNB may also configure an additional power offset, depending for example on the desired received SINR, the measured uplink interference and noise level in the time-frequency slots allocated to RACH preambles, and possibly on the preamble format. Furthermore, the eNB may configure preamble power ramping so that the transmission for each retransmitted preamble, e.g., in case the PRACH transmission attempt was not successfully, is increased by a fixed step.

Random Access Preamble—Time, Frequency, Formats

The random access preamble transmission part of the random access procedure described above is mapped at the physical layer onto the PRACH. The design of the preamble is crucial to the success of the random access procedure and will be discussed in detail in the following. The RACH preamble is basically a cyclic shift of a complex Zadoff-Chu (ZC) sequence which is also known as preamble signature. The LTE PRACH preamble consists of a complex sequence. However, differing from the W-CDMA preamble, it is also an OFDM symbol having to follow the DFT-S-OFDM structure of the LTE uplink, build with a CP (cyclic prefix), thus allowing for an efficient frequency-domain receiver at the eNodeB. The physical layer random access preamble consists of a cyclic prefix of length $T_{CP}$ and a sequence part of length $T_{SEQ}$, as illustrated in FIG. 5. Possible values for these parameters are listed in the following table and depend on the frame structure and on the random access configuration (e.g., the preamble format which can be controlled by higher layers). Corresponding detailed information can be found in the 3GPP technical standard 36.211, current version 12.6.0, chapter 5.7.1 "Time and frequency structure" incorporated herein by reference. Four random access preamble formats are defined for the frequency division duplex operation wherein each format is defined by the duration of the sequence and its cyclic prefix. The format configured in a cell is broadcast in the system information.

| Preamble format | $T_{CP}$ (μs) | $T_{SEQ}$ (μs) | Typical Usage |
|---|---|---|---|
| 0 | $3168 \cdot T_s$ | $24576 \cdot T_s$ | Normal 1 ms random access burst with 800 μs preamble sequence for small to medium cells |

-continued

| Preamble format | $T_{CP}$ (μs) | $T_{SEQ}$ (μs) | Typical Usage |
|---|---|---|---|
| 1 | $21024 \cdot T_s$ | $24576 \cdot T_s$ | 2 ms random access burst with 800 μs preamble sequence, for large cells without a link budget problem |
| 2 | $6240 \cdot T_s$ | $2 \cdot 24576 \cdot T_s$ | 2 ms random access burst with 1600 μs preamble sequence, for medium cells supporting low data rates |
| 3 | $21024 \cdot T_s$ | $2 \cdot 24576 \cdot T_s$ | 3 ms random access burst with 1600 μs preamble sequence, for very large cells |
| 4 (see Note) | $448 \cdot T_s$ | $4096 \cdot T_s$ | 2 OFDM symbol random access burst with 147.6 μs preamble sequence, for TDD special sub frames in small cells |

NOTE:
Frame structure type 2 and special subframe configurations with UpPTS lengths $4384 \cdot T_s$ and $5120 \cdot T_s$ only.

TS is the assumed system sampling rate, which can be 1/30,72 μs and is the basic time unit in LTE. Taking this specific sampling rate into account, the following table gives the values for $T_{CP}$ and $T_{SEQ}$ for the different preamble formats.

| Preamble format | $T_{CP}$ (us) | $T_{SEQ}$ (us) |
|---|---|---|
| 0 | 103.33 | 800 |
| 1 | 684.38 | 800 |
| 2 | 203.13 | 1600 |
| 3 | 684.38 | 1600 |
| 4 | 14.58 | 133.33 |

In the following table the subcarrier spacing and the corresponding symbol duration of the current LTE specification is shown. The preamble sequence duration for, e.g., preamble formats 2 and 3 (1600 μs, see above table) are achieved by repetition of the preamble symbol (800 μs) in the time domain.

| Transmission type | Subcarrier spacing (kHz) | Symbol duration (us) |
|---|---|---|
| PUSCH | 15 | 66.66 |
| Preamble format 0-3 | 1.25 | 800 |
| Preamble format 4 | 7.5 | 133.33 |

The lower bound (683.33 μs) for the sequence duration $T_{SEQ}$ must allow for unambiguous round-trip time estimation for a UE located at the edge of the largest expected cell, including the maximum delay spread expected in such large cells (namely 16.67 μs). Further constraints on the sequence duration $T_{SEQ}$ are given by the Single-Carrier Frequency Division Multiple Access signal generation principle, such that the size of the DFT and IDFT, $N_{DFT}$, must be an integer number.

In order to ease the frequency multiplexing of the PRACH and the PUSCH resource allocations, a PRACH slot must be allocated a bandwidth $BW_{PRACH}$ equal to an integer multiple of resource blocks, i.e., an integer multiple of 180 kHz. For simplicity, $BW_{PRACH}$ in LTE (6 PRBs, 1.08 MHz) is constant for all system bandwidths; it is chosen to optimize both the detection performance and the timing estimation accuracy. The latter drives the lower bound of the PRACH bandwidth. Indeed, a minimum bandwidth of about 1 MHz is necessary to provide a one-shot accuracy of about ±0.5 μs, which is an acceptable timing accuracy for PUCCH/PUSCH transmissions.

A PRACH allocation of 6 RBs provides a good trade-off between PRACH overhead, detection performance and timing estimation accuracy. It should be noted that for the smallest system bandwidth (1.4 MHz, 6 RBs) the PRACH overlaps with the PUCCH; it is left to the eNodeB implementation whether to implement scheduling restrictions during PRACH slots to avoid collisions, or to let PRACH collide with the PUCCH and handle the resulting interference.

The preamble duration should be fixed to an integer duration of the PUSCH symbol in order to provide compatibility between preamble and PUSCH subcarriers. This means that the PRACH subcarrier spacing should preferably be a divisor of the PUSCH subcarrier spacing.

A PRACH is time- and frequency-multiplexed with the PUSCH and the PUCCH as illustrated in FIG. 6. PRACH time-frequency resources are semi-statically allocated within the PUSCH region, and repeat periodically. The possibility of scheduling PUSCH transmissions within PRACH slots is left to the eNodeB's discretion. LTE supports 64 PRACH configurations, each configuration consisting of a periodic PRACH resource pattern and an associated preamble format. A detailed listing of the PRACH configurations is given in Tables 5.7.1-2 and 5.7.1-3 of the technical standard 36.211, incorporated herein by reference. It is possible to schedule PUSCH transmissions together with allocated PRACH resources within the same subframe; the decision is made by the eNB.

Random Access Preamble—Preamble Sequence Generation

As noted above, 64 PRACH signatures are available in LTE, compared to only 16 in WCDMA. This can not only reduce the collision probability, but also allows for 1 bit of information to be carried by the preamble in the contention-based and some signatures to be reserved for contention-free access. Therefore, the LTE PRACH preamble called for an improved sequence design with respect to WCDMA. In LTE prime-length Zadoff-Chu sequences have been chosen which enable improved PRACH preamble detection performance. More detailed information can be found in the 3GPP technical standard 36.211, current version 12.6.0, chapter 5.7.2 "physical random access channel" incorporated herein by reference.

The random access preambles are Zadoff-Chu (ZC) sequences that are in turn generated from one or several root Zadoff-Chu sequences as follows. First, a root Zadoff-Chu sequence is chosen based on an indication of a logical sequence index broadcast as part of the System Information (RACH_ROOT_SEQUENCE). The logical root sequence order is cyclic such that the logical index 0 is consecutive to 837. The relation between a logical root sequence index (indicated in the system information) and a physical root sequence index u is given by Tables 5.7.2-4 and 5.7.2-5 of the technical standard 36.211 for preamble formats 0-3 and 4, respectively, incorporated herein by reference.

The u-th root Zadoff-Chu sequence is defined by:

$$x_u(n) = e^{-j\frac{\pi u n(n+1)}{N_{ZC}}},\ 0 \le n \le N_{ZC} - 1$$

where u is the above-mentioned physical root sequence index, and wherein the sequence length $N_{ZC}$ depends on the configured PRACH preamble format, i.e., $N_{ZC}$ is 839 for preamble formats 0-3 and is 139 for preamble format 4 (see also Table 5.7.2-1 in TS 36.211).

From the u-th root Zadoff-Chu sequence, a set of 64 random access preambles with zero-correlation zones of length $N_{CS}$-1 are defined by cyclic shifts according to $$x_{u,v}(n)=x_u((n+C_v)\bmod N_{ZC})$$

The cyclic shift is given by $$C_v = \begin{cases} vN_{CS} & v = 0, 1, \ldots, \lfloor N_{ZC}/N_{CS} \rfloor - 1, N_{CS} \neq 0 \quad \text{for unrestricted sets} \\ 0 & N_{CS} = 0 \quad \text{for unrestricted sets} \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \bar{n}_{shift}^{RA} - 1 \quad \text{for restricted sets} \end{cases}$$

The parameter $N_{CS}$ is given by Tables 5.7.2-2 and 5.7.2-3 in the Technical Standard 36.211, and depends on the preamble format and on the zeroCorrelationZoneConfig parameter provided by higher layers. Further information can be obtained from the technical standard 36.211, section 5.7.2.

Additional preamble sequences, in case 64 preambles cannot be generated from a single root Zadoff-Chu sequence, are obtained from one or more root sequences with consecutive logical indexes until all the 64 preamble sequences are found.

In summary, the set of 64 preamble sequences that are available for use in a cell for the RACH procedure is generated by cyclic shifts of one or more root Zadoff-Chu sequences.

Random Access Preamble—Baseband Signal Generation

The generation of the PRACH baseband signal is defined in section 5.7.3 of TS 36.211. The time-continuous random access signal s(t) is defined by $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi\left(k+\varphi+K\left(k_0+\frac{1}{2}\right)\right)\Delta f_{RA}(t-T_{CP})}$$

where $0 \le t < T_{SEQ}+T_{CP}$, $\beta_{PRACH}$ is an amplitude scaling factor in order to conform to the transmit power $P_{PRACH}$, $k_0=n_{PRB}^{RA}N_{sc}^{RB}-N_{RB}^{UL}N_{sc}^{RB}/2$.

The location in the frequency domain is controlled by the parameter $n_{PRB}^{RA}$. The factor $K=\Delta f/\Delta f_{RA}$ accounts for the difference in subcarrier spacing between the random access preamble and uplink data transmission. The variable $\Delta f_{RA}$, the subcarrier spacing for the random access preamble, and the variable φ, a fixed offset determining the frequency-domain location of the random access preamble within the physical resource blocks, are both given by the following table (see Table 5.7.3-1 in TS 36.211).

| Preamble format | $\Delta f_{RA}$ | φ |
|---|---|---|
| 0-3 | 1250 Hz | 1 |
| 4 | 7500 Hz | 2 |

It should be noted that PUSCH has a subcarrier spacing of 15 kHz.

The time-domain preamble sequence is transformed into the frequency domain by a DFT of size $N_{ZC}$. The resulting frequency-domain coefficients are mapped onto subcarriers with a frequency spacing $\Delta f_{RA}$. The frequency spacing for PRACH transmissions does not coincide with the frequency spacing used for other uplink transmissions, such as PUSCH or PUCCH. The subcarrier mapping further incorporates the PRACH location in the frequency domain.

FIG. 7 shows the PRACH preamble mapping onto allocated subcarriers, vis-à-vis the subcarrier mapping of PUSCH. As apparent therefrom, the PRACH uses a guard band to avoid the data interference at preamble edges. The PRACH is transmitted on a frequency-domain resource corresponding to six consecutive PRBs, i.e., with a frequency bandwidth of 1.08 MHz. These PRBs could be located at the center of the nominal system bandwidth as illustrated in FIG. 8, or could be located at any other position within the nominal system bandwidth as shown in FIG. 9.

Random Access Preamble—Preamble Sequence UE Transmitter Implementation

In the following an exemplary practical implementation of the PRACH function will be briefly explained The PRACH preamble can be generated at the system sampling rate by means of a large IDFT as illustrated in FIG. 10. The DFT block in the FIG. 10 is dashed indicating that it is optional since the sequence could also be mapped directly in the frequency domain at the IDFT input. The cyclic shift can be implemented either in the time domain after the IDFT, or in the frequency domain before the IDFT through a phase shift.

Another option for generating the preamble consists of using a smaller IDFT, actually an IFFT, and shifting the preamble to the required frequency location through time-domain upsampling and filtering. The cyclic prefix can be inserted before the upsampling and time-domain frequency shift, so as to minimize the intermediate storage requirements.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however, shall not be excluded.

The currently-intended general LAA approach at 3GPP is to make use of the already specified Rel. 12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 11, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed that the LAA will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which partly may depend on the geographical region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, Sep. 2014 incorporated herein by reference as well as the 3GPP Technical Report 36.889, current version 13.0.0. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

For example, in Europe certain limits for the Nominal Channel Bandwidth is set, as apparent from section 4.3 of the European standard ETSI EN 301 893, current version 1.8.1, incorporated herein by reference. The Nominal Channel Bandwidth is the widest band of frequencies, inclusive of guard bands, assigned to a single channel. The Occupied Channel Bandwidth is the bandwidth containing 99% of the power of the signal. A device is permitted to operate in one or more adjacent or non-adjacent channels simultaneously.

When equipment has simultaneous transmissions in adjacent channels, these transmissions may be considered as one signal with an actual Nominal Channel Bandwidth of "n" times the individual Nominal Channel Bandwidth where "n" is the number of adjacent channels. When equipment has simultaneous transmissions in non-adjacent channels, each power envelope shall be considered separately. The Nominal Channel Bandwidth shall be at least 5 MHz at all times. The Occupied Channel Bandwidth shall be between 80% and 100% of the declared Nominal Channel Bandwidth. In the USA, the minimum occupied channel bandwidth is 500 kHz according to 3GPP TR 36.889. In case of smart antenna systems (devices with multiple transmit chains) each of the transmit chains shall meet this requirement. During an established communication, the device is allowed to operate temporarily with an Occupied Channel Bandwidth below 80% of its Nominal Channel Bandwidth with a minimum of 4 MHz.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively.

European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In unlicensed spectrum, channel availability cannot always be guaranteed. In addition, certain regions such as Europe and Japan prohibit continuous transmissions and impose limits on the maximum duration of a transmission burst in the unlicensed spectrum. Hence, discontinuous transmission with limited maximum transmission duration is a required functionality for LAA. DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0, incorporated herein by reference.

Following this European regulation regarding LBT, devices have to perform a Clear Channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe 20

μs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 12, the figure being taken from ETSI EN 301 893 (there FIG. 2: "Example of timing for Frame Based Equipment").

FIG. 13 illustrates the timing between a Wi-Fi transmission and LAA UE transmissions on a particular frequency band (unlicensed cell). As can be seen from FIG. 13, after the Wi-Fi burst, a CCA gap is at least necessary before the eNB "reserves" the unlicensed cell by, e.g., transmitting a reservation signal until the next subframe boundary. Then, the actual LAA DL burst is started.

The RACH procedure shall also be supported for unlicensed bands. It was agreed so far that only contention-free PRACH transmissions would be supported for unlicensed bands. It is still under discussion whether PRACH retransmissions will be scheduled explicitly by the eNB as well in unlicensed bands, in contrast to the PRACH retransmissions in licensed bands, as explained above. Nevertheless, even though the standardization has so far agreed that only contention-free random access shall be supported, this may change in the future and thus contention-based random access for unlicensed cells may still become relevant (actually, the principles of the disclosure are applicable to both contention-free and contention-based random access procedures).

Considering the different regulatory requirements, it is apparent that the LTE specification, among other things the random access procedure, for operation in unlicensed bands will require several changes compared to the current Rel. 12 specification that is limited to licensed band operation.

BRIEF SUMMARY

Non-limiting and exemplary embodiments provide improved methods for performing a random access procedure between a user equipment and a radio base station via an unlicensed cell. The independent claims provide non-limiting and exemplary embodiments. Advantageous embodiments are subject to the dependent claims.

According to several implementations of the aspects described herein, the random access procedure is improved particularly when being performed via unlicensed cell(s). More specifically, mainly the preamble sequence part (generation, selection and actual RF transmission of the preamble) of the random access procedure is improved; thus, further parts of the random access procedure are not the focus of the various aspects described and may for instance (mostly) stay the same as the random access procedure designed for licensed access.

The following scenario is assumed in the following. The user equipment and a radio base station are connected to each other via at least one unlicensed cell in a mobile communication system. The unlicensed cell may be either operated as a standalone cell or may be assisted by a further licensed cell additionally configured for the user equipment. The unlicensed cell is set up having a particular frequency bandwidth, i.e., the unlicensed cell is operated by the radio base station and the user equipment on a channel having a particular frequency bandwidth in the unlicensed frequency spectrum, such as 10 MHz, 20 MHz, 40 MHz or even smaller or larger bandwidths.

In addition, transmissions on the unlicensed cell are regulated at least in that a minimum frequency bandwidth threshold is defined, indicating a minimum channel occupation that a transmission via the unlicensed cell shall occupy. The minimum channel occupation is dependent on the frequency bandwidth of the unlicensed cell, and thus may vary from one channel to the next; the minimum channel occupation may define a predetermined percentage of the corresponding total frequency bandwidth of the unlicensed cell.

In a thus defined scenario basically most of the transmissions performed by the UE (and the eNodeB) via the unlicensed cell have to comply with this minimum channel occupation requirement. This is also true for the random access procedure performed between the user equipment and the radio base station, e.g., for synchronizing the uplink reference timing of the user equipment or for transmitting a scheduling request to the radio base station. As part of the random access procedure, the user equipment, after selecting an appropriate random access preamble sequence, transmits same to the radio base station.

According to several aspects, the minimum frequency bandwidth threshold defined for the transmissions via the unlicensed cell is also taking into account when transmitting the random access preamble sequence to the radio base station as part of the random access procedure. In particular, the random access preamble sequence shall be transmitted such that at least the minimum frequency bandwidth threshold defined for the unlicensed cell is exceeded to thereby comply with the minimum channel occupation requirement.

To said end, a particular frequency bandwidth may be determined for transmitting the random access preamble sequence via the unlicensed cell, which is larger than the minimum frequency bandwidth threshold. Such a determination allows to flexibly handle different channel bandwidths of the unlicensed cell and thus to handle and comply with different minimum channel occupation requirements. This determination may be performed at the user equipment or the radio base station. In exemplary implementations, the minimum frequency bandwidth threshold (e.g., the determination is simply calculating a predetermined percentage of the frequency bandwidth of the unlicensed cell) is known to both the user equipment and the radio base station, such that the frequency bandwidth which the random access preamble sequence transmission shall occupy can be independently determined by the UE and the radio base station. Alternatively, the determination may be performed by one of the two entities (be it the UE or the radio base station) and then correspondingly informed to the other entity. In case the radio base station is the responsible entity for determining the actual frequency bandwidth of the preamble transmission signal, the radio base station maintains control of the frequency bandwidth actually used by the UE for transmitting the random access preamble sequence. The transmission of such information by the radio base station to the UE may be simply done in a corresponding system information broadcast in the radio cell or, for contention-free random access, in a corresponding message transmitted at the beginning of the contention-free random access procedure, e.g., in the same message which indicates the preamble to be used.

In this connection, it should be noted that contention-free as well as contention-based random access procedures shall be supported. In particular, in a contention-free random access procedure the radio base station transmits a corresponding indication to the user equipment to indicate which random access preamble sequence is to be selected from a set of random access preamble sequences is available to the UE (and the radio base station), to which the user equipment then complies. On the other hand, in a contention-based random access procedure no such indication is provided by the radio base station, rather the user equipment autonomously selects a random access preamble sequence to be transmitted to the radio base station from the set of random access preamble sequences. In a similar manner as in the currently-defined standard random access procedure, the set of random access preamble sequences available for the contention-based random access procedure can be divided in two different subgroups which are associated with different amounts of transmission resources to be requested via the transmission of the random access preamble sequence.

In summary, the user equipment is thus enabled to comply with the minimum channel occupation requirement defined for an unlicensed cell when performing random access procedures via this unlicensed cell.

The random access procedure may continue in a usual manner, thus possibly including the transmission of a random access response message from the radio base station to the user equipment. The random access response may include for instance a corresponding uplink resource assignment, a timing alignment instruction, a temporary identifier for the user equipment as well as an identification of the random access preamble sequence previously transmitted by the user equipment. In addition, upon receiving such a random access response message from the radio base station, a further message may be transmitted from the user equipment to the radio base station using the assigned uplink resources. Also, should contention-based random access procedure be performed, a contention resolution may be necessary and is accordingly performed between the eNodeB and the UE.

Two different aspects are described in the following so as to achieve that the transmission of the random access preamble sequence via the unlicensed cell complies with the corresponding minimum channel occupation, i.e., exceeds the minimum frequency bandwidth threshold.

According to a first aspect, the existing procedure for transmitting a random access preamble sequence is reused by repeating the usual preamble transmission at different positions in the frequency domain so as to finally occupy at least the necessary frequency bandwidth of the unlicensed cell so as to comply with the regulatory requirements set up for such unlicensed cells. In particular, the random access preamble sequence is selected in the usual manner and transmitted in a corresponding frequency position; it should be noted that the usual/legacy random access preamble transmission occupies a predetermined frequency bandwidth (as explained in the background section, 6 PRBs, i.e., 1.08 MHz). Furthermore, several repetitions of this transmission are performed however at different frequency positions such that all the preamble transmissions (with the repetitions) occupy a frequency bandwidth which exceeds the minimum frequency bandwidth threshold of the unlicensed cell. The number of repetitions necessary to comply with this minimum channel occupation depends on the actual frequency bandwidth threshold defined for the unlicensed cell which in turn depends on the frequency bandwidth set up for the unlicensed cell; the number of repetitions also depends on the above-mentioned predetermined frequency bandwidth of a usual/legacy random access preamble transmission (i.e., 1.08 MHz). In an exemplary implementation of the first aspect, the different locations in the frequency domain at which the repetitions of the preamble transmissions are performed are such that the repeated transmissions are adjacent in the frequency domain.

As explained above, the improved random access procedure provided for unlicensed cells according to the first aspect reuses the random access preamble sequences already defined for the usual/legacy random access procedure for licensed cells. This has the advantage that no additional set(s) of random access preambles have to be defined in said respect. The same set of random access preamble sequences is available for performing the random access procedure via the unlicensed cell as well as via a licensed cell. In particular, according to the first aspect, when performing a random access procedure via the licensed cell, a further random access preamble sequence is selected from the already generated set and is transmitted via the licensed cell to the radio base station occupying the above discussed predetermined frequency bandwidth of the licensed cell (i.e., 6 PRBs, 1.08 MHz).

According to a further implementation of the first aspect, at least two random access preamble sequences are selected and transmitted to gather by the user equipment to the radio base station. In particular, at least a second random access preamble sequence is selected, different from the first-selected random access preamble sequence. In a similar manner, the transmission of the second random access preamble sequence is also repeated, however at different frequency locations than the first random access preamble sequence transmissions. In particular, the first and second random access preamble sequences are repeated and transmitted together so as to occupy at least the determined frequency bandwidth of the unlicensed cell so as to comply with the minimum channel occupation.

According to a second aspect, the existing random access procedure, particularly the existing configuration for transmitting the random access preamble sequence, is changed in that the length of the random access preamble sequence and the subcarrier frequency spacing for the frequency subcarriers used for transmitting the random access preamble sequence are selected such that in combination the corresponding transmission of the random access preamble sequence exceeds the minimum frequency bandwidth threshold. In the following, it should be distinguished between the preamble sequence length and the preamble duration in the time domain. The first determines the number of used subcarriers. The latter is given by one or multiple repeated preamble symbols plus the cyclic prefix (the preamble symbol duration is given by the inverse of the preamble subcarrier spacing) and is not the focus of the various aspects of the disclosure.

It should be noted that the length of the random access preamble sequence (which basically corresponds to the number of frequency subcarriers which are then used for transmitting the random access preamble sequence) as well as the subcarrier frequency spacing (which basically determines how far the different frequency subcarriers are spaced apart from each other) together define the overall frequency bandwidth of the preamble transmission, namely simply by multiplying the number of frequency subcarriers with the value of the subcarrier frequency spacing. Consequently, by coordinating these two parameters (i.e., preamble sequence length as well as the subcarrier frequency spacing), the frequency shape/bandwidth of the preamble signal can be controlled so as to comply with the frequency bandwidth requirement that such signal shall occupy on unlicensed cells.

One or both of the two parameters can be controlled by either the user equipment or the radio base station or a combination thereof. Several different implementations of the second aspect are possible in said respect. For instance, the subcarrier frequency spacing could be made fix while allowing the preamble sequence length to be flexibly determined depending on the actual amount of frequency bandwidth that the preamble transmission has to occupy (depending on the system bandwidth for the unlicensed cell). Or the other way round, the preamble sequence length can be made fix while allowing the subcarrier frequency spacing to be flexibly adapted to differing minimum channel occupation requirements. Still alternatively, both the preamble sequence length as well as the subcarrier frequency spacing can be flexibly controlled for the preamble transmission so as to occupy the necessary frequency bandwidth to comply with the minimum channel occupation requirement of unlicensed cells.

In exemplary implementations of the second aspect, two different sets of random access preamble sequences may be generated by the user equipment, one for the licensed cell(s) and one for the unlicensed cell(s). It should be noted that the length of random access preamble sequences for the unlicensed cell will likely be larger than the length of random access preamble sequences for the licensed cell in view of that the frequency bandwidth to be occupied by the random access preamble transmission is larger for unlicensed cells than for licensed cells. Correspondingly, the two different sets comprise random access preamble sequences of different lengths. Assuming for one exemplary implementation that the random access preamble sequences are generated from suitable root sequences (e.g., Zadoff-Chu sequences), the corresponding root sequence for generating random access preamble sequences to be used in connection with the unlicensed cell are longer than a root sequence used to generate random access preamble sequences for the licensed cell. Correspondingly, when performing a random access procedure via the licensed cell, the corresponding preamble is selected from the corresponding licensed cell set, whereas, when performing a random access procedure via the unlicensed cell, the corresponding preamble is selected from the corresponding unlicensed cell set.

Correspondingly, in one general first aspect, the techniques disclosed here feature a method for performing a random access procedure between a user equipment and a radio base station in a mobile communication system. The user equipment is configured with at least one unlicensed cell, and the random access procedure is performed via the unlicensed cell having an unlicensed cell frequency bandwidth. A minimum frequency bandwidth threshold is defined for transmissions via the unlicensed cell, and the method comprises the following steps performed by the user equipment for the random access procedure. The user equipment selects a random access preamble sequence for the random access procedure, and determines a frequency bandwidth for transmitting the random access preamble sequence via the unlicensed cell. The determined frequency bandwidth of the random access preamble sequence is at least the minimum frequency bandwidth threshold. The user equipment transmits the random access preamble sequence to the radio base station such that at least the determined frequency bandwidth of the unlicensed cell is occupied.

Correspondingly, in one general first aspect, the techniques disclosed here feature a user equipment for performing a random access procedure with a radio base station in a mobile communication system. The user equipment is configured with at least one unlicensed cell, and the random access procedure is performed via the unlicensed cell having an unlicensed cell frequency bandwidth. A minimum frequency bandwidth threshold is defined for transmissions via the unlicensed cell. A processor of the user equipment selects a random access preamble sequence for the random access procedure. The processor further determines a frequency bandwidth for transmitting the random access preamble sequence via the unlicensed cell. The determined frequency bandwidth is at least the minimum frequency bandwidth threshold. A transmitter of the user equipment transmits the random access preamble sequence to the radio base station such that at least the determined frequency bandwidth of the unlicensed cell is occupied.

Correspondingly, in one general first aspect, the techniques disclosed here feature a radio base station for performing a random access procedure with a user equipment in a mobile communication system. The user equipment is configured with at least one unlicensed cell, and the random access procedure is performed via the unlicensed cell having an unlicensed cell frequency bandwidth. A minimum frequency bandwidth threshold is defined for transmissions via the unlicensed cell. A frequency bandwidth is determined for the user equipment to transmit the random access preamble sequence via the unlicensed cell, the determined frequency bandwidth being at least the minimum frequency bandwidth threshold. A receiver of the radio base station receives the random access preamble sequence, selected by the user equipment for the random access procedure, such that at least a determined frequency bandwidth of the unlicensed cell is occupied. The determined frequency bandwidth is at least the minimum frequency bandwidth threshold.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

DETAILED DESCRIPTION

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier operated in an unlicensed frequency band, with a particular frequency bandwidth. Correspondingly, the term "licensed cell" or alternatively "licensed carrier" as used in the set of claims and in the application is to be understood broadly as a cell/carrier operated in a licensed frequency band, with a particular frequency bandwidth. Exemplarily, these terms are to be understood in the context of 3GPP as of Release 12/13 and the Licensed-Assisted Access Work Item.

The term "minimum frequency bandwidth threshold" as used in the set of claims and in the application is to be understood as a minimum channel occupation for the unlicensed cell(s). In other words, transmissions via the unlicensed cells shall occupy frequency-wise at least the amount set by this threshold. For instance, the minimum channel occupation is given by regulations defined for certain geographical regions, e.g., for Europe 80% of the system bandwidth. Thus, in Europe transmissions on an unlicensed cell with 20 MHz will have to at least occupy 16 MHz.

Figure 1:
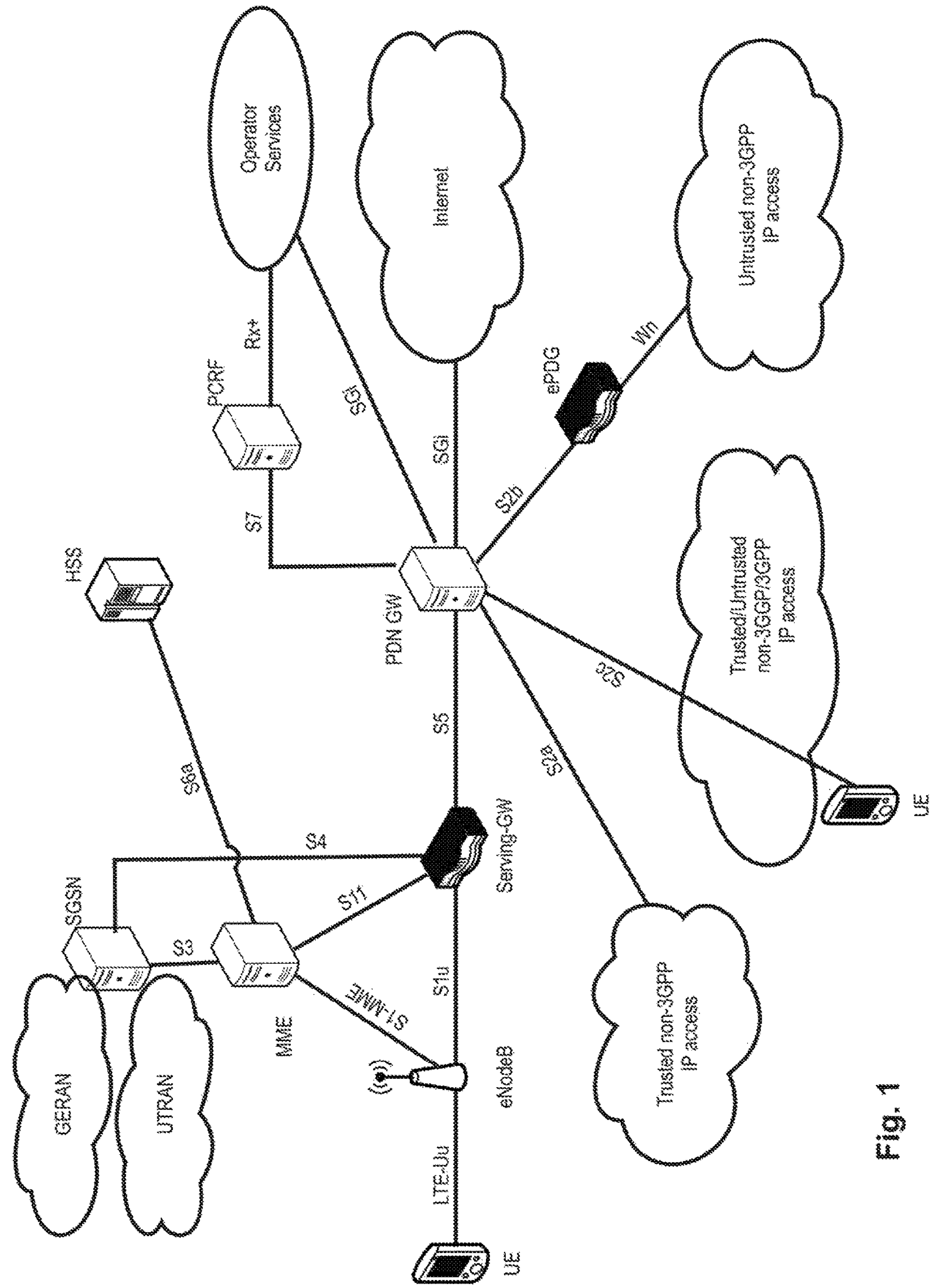
FIG. 1 shows an exemplary architecture of a 3GPP LTE system.
Figure 2:
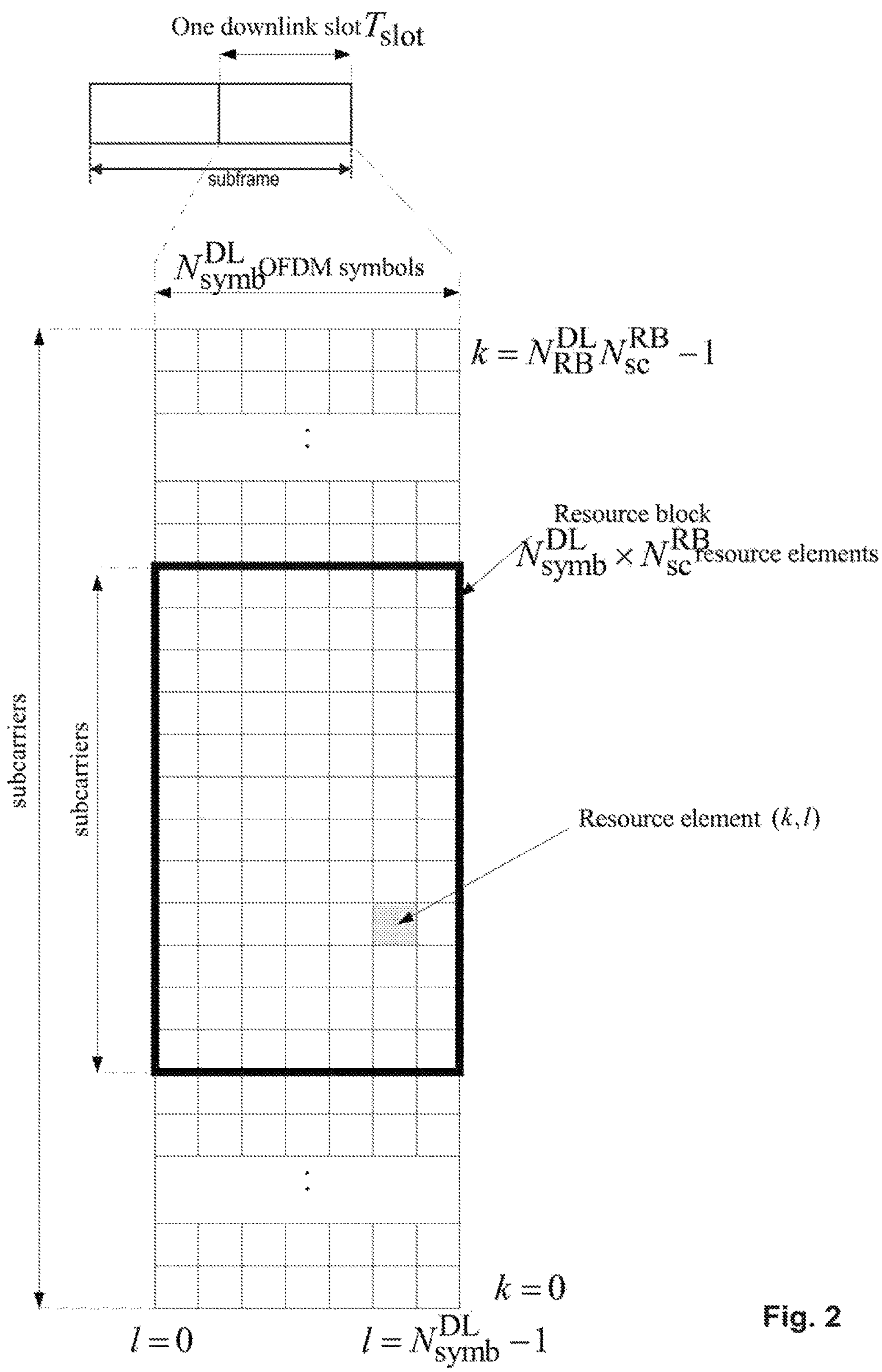
FIG. 2 shows an exemplary downlink resource grid of a downlink slot of a subframe as defined for 3GPP LTE (Release 8/9)
Figure 3:
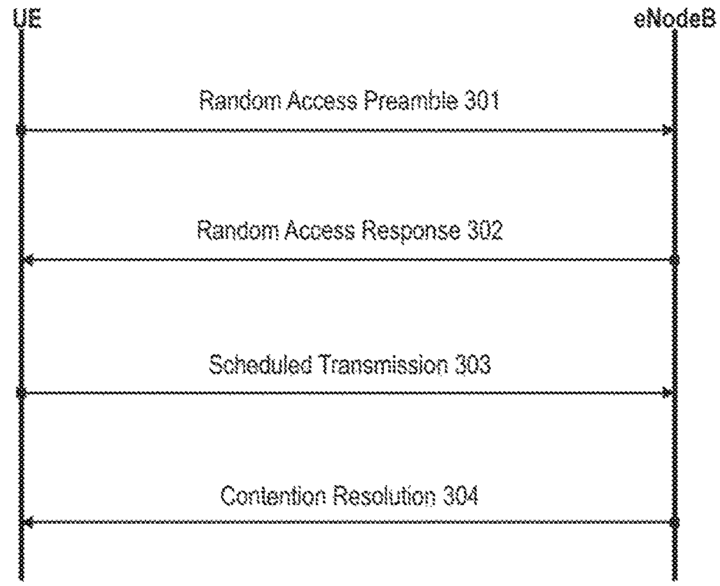
FIG. 3 shows a contention-based RACH procedure as defined for 3GPP LTE (as of Release 8/9) in which contentions may occur.
Figure 4:
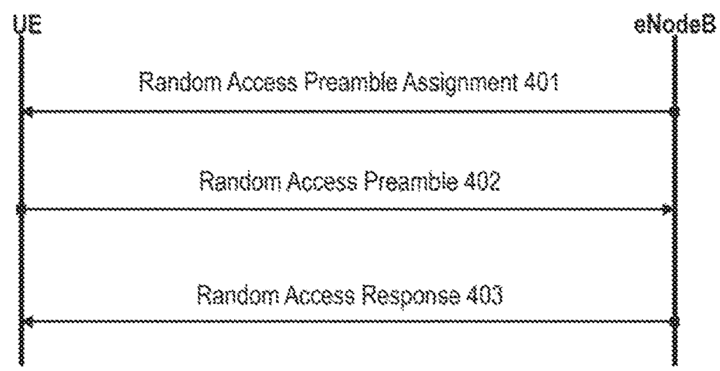
FIG. 4 shows a contention-free RACH procedure as defined for 3GPP LTE (as of Release 8/9)

The term "random access procedure" used in the set of claims and in the application may in one exemplary embodiment be construed as the random access procedure of the 3GPP standardization as explained in the background section. The terms "random access preamble sequence", "preamble sequence", "preamble", "RACH preamble", "preamble signature" can be used interchangeably to refer to the complex sequence transmitted by the UE during the random access procedure, in one exemplary embodiment the preamble message transmitted as explained for steps 301, 401 of FIGS. 3 and 4 respectively.

The term "repeating" used in the set of claims and in the application shall be construed broadly as "performing a particular action several times", in this particular case the transmission of the preamble is performed several times however at different positions in the frequency domain.

The terms "occupy", "occupy a frequency bandwidth" as used in the set of claims and in the application may be broadly construed as meaning that the particular transmission of a signal/message/preamble is performed by using (all) the frequencies of the particular frequency bandwidth.

As explained in the background section, 3GPP is currently in the process of introducing the licensed-assisted access (LAA). Although some agreements have been achieved already for LAA, no agreements could yet be achieved for some important issues in said respect. Furthermore, it is apparent that the LTE specification for supporting the RACH procedure in unlicensed bands will profit from several changes compared to the current specification that is limited to licensed band operations.

One straightforward solution for introducing the random access procedure for LAA would be to apply the existing random access procedure for licensed cells also for unlicensed cells, including the existing preamble formats, signal shape and transmission procedures as described in the background section. In this case, the CCA can be performed on the UE side directly prior to the PRACH transmission opportunity, or alternatively on the eNodeB side prior to scheduling a PRACH transmission opportunity. In still alternative solutions, it may also be possible to skip CCA related to the PRACH scheduling and transmission, which might however cause problems with other nodes operating in the same radio channel due to potential collisions of the transmissions. It should be also noted that whether CCA is at the end required or not depends on the regulatory rules of the region where the system is operated (see background section and TR 36.889).

However, this straightforward approach also has disadvantages. Particularly, according to the European regulation as explained in the background section, each transmission on the unlicensed band that follows a CCA (Clear Channel assessment) has to occupy at least 80% of the nominal channel bandwidth. Similar regulation can also be found for other countries such as the USA where the minimum transmission bandwidth is 500 kHz (see 3GPP TR 36.889). Assuming a nominal channel bandwidth of 20 MHz for the LTE operation in unlicensed bands (e.g., see TR 36.889), the minimum channel occupation of 80% set up for Europe results in a minimum frequency bandwidth of 16 MHz. On the other hand, a PRACH transmission following the existing definition in licensed bands occupies however only 6 consecutive PRBs, independent from the channel bandwidth, which corresponds to 1.08 MHz, i.e., only 5.4% of the nominal channel bandwidth of 20 MHz. Correspondingly, the straightforward solution, applying the existing definition of the PRACH transmission for unlicensed cells does therefore not fulfill the requirements for the minimum channel occupation given by the European regulation.

In addition, it should be noted that this minimum channel occupation is dependent on the actual channel bandwidth of the unlicensed cell and thus may vary from one unlicensed cell to the next. In other words, the transmission of the random access preamble has to adapt to the channel bandwidth so as to be able to comply with the minimum channel occupation requirement defined for unlicensed cells. In contrast thereto, the existing random access procedure, particularly the transmission of the random access preamble is fixed in its bandwidth, namely always using 6 PRBs, independent from the actual channel bandwidth of the (licensed) cell. Correspondingly, a further disadvantage of using the existing mechanism for the random access preamble transmission via unlicensed cells is that it lacks flexibility to comply with the minimum channel occupation requirement which actually may change depending on the channel bandwidth of the unlicensed cell.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in these particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel. 12/13) environment. The various embodiments mainly allow for an improved random access procedure, particularly for an improved transmission of the random access preamble. Other functionality (i.e., functionality not changed by the various embodiments) however may remain exactly the same as explained in the background section or may be changed without any consequences to the various embodiments; for instance functions and procedures leading to the performance of the improved random access procedure (such as the need of uplink synchronization or the need to transmit a scheduling request), and also the remaining steps of the random access procedure (such as the random-access response, contention resolution, etc.).

In the following, three embodiments are described for solving the above problem(s), which will be explained by using the following exemplary scenario, devised to easily explain the principles of the embodiment. The principles however can also be applied to other scenarios, some of which will be explicitly mentioned in the following.

As explained in the background section, 3GPP is planning to enhance current systems by introducing LAA, licensed-assisted access, including the use of unlicensed cells being operated on channel(s) in the unlicensed frequency spectrum. In the following such a scenario is assumed, i.e., the UE is configured with at least one licensed cell and at least one unlicensed cell. Although the following explanations are based on such a scenario, the different embodiments focus on performing a random access procedure on the unlicensed cell, such that the different embodiments also apply to scenarios where the unlicensed cell is operated in a stand-alone manner (i.e., without a corresponding licensed cell).

The unlicensed cell can be configured between the eNodeB and the UE in the usual manner as described in the background section. Accordingly, the unlicensed cell is operated on a particular channel in the unlicensed frequency spectrum having a particular frequency bandwidth (also termed nominal channel bandwidth in some European standards), such as 10 MHz, 20 MHz, 40 MHz or even smaller or larger bandwidths (in the future). As explained in detail in the background section, operation on the unlicensed cell is regulated in many ways, e.g., in Europe according to the European standard ETSI 301 893. Among many things, for European (and also for other regions a minimum channel occupation is defined for the unlicensed cell channel, e.g., in Europe that the occupied channel bandwidth for the unlicensed cell shall be between 80% and 100% of the declared nominal channel bandwidth of the unlicensed cell. Correspondingly, any transmissions on the unlicensed cell (with very few exceptions) must comply with this minimum channel occupation requirement such that the transmissions shall occupy a corresponding frequency bandwidth part of the total unlicensed cell frequency bandwidth. In view of that an unlicensed cell can have different nominal channel bandwidths, also the resulting necessary minimum frequency bandwidth to be occupied (being a percentage of the nominal channel bandwidth) is different between channels having different nominal channel bandwidths.

For the following embodiments it is assumed that both the eNodeB and the UE are aware of the particular minimum channel occupation that is to be complied with. The UE and the eNodeB will be aware of the minimum frequency bandwidth threshold, which depends on the actual system bandwidth with which the unlicensed cell is set up. There are different possibilities on how this may be achieved. In one alternative, both the UE and the eNodeB will independently from each other determine the particular minimum frequency bandwidth threshold, both arriving at the same value by following the same rules of determination. In another alternative, the eNodeB will determine the particular minimum frequency bandwidth threshold and will correspondingly inform the UE about it, e.g., in a system information broadcast message, during an RRC connection setup message, or, in case of a contention-free random access procedure, within the random access preamble assignment message transmitted at the beginning of the random access procedure (see message 401 of FIG. 4). According to still another alternative, the UE will determine the particular minimum frequency bandwidth threshold and will correspondingly inform the eNodeB about it. In any case, both the UE and the eNodeB will have the same understanding on the minimum frequency bandwidth threshold that the preamble transmission as to at least occupy.

This minimum frequency bandwidth threshold represents a lower limit for the frequency bandwidth which the random access preamble transmission has to occupy. The actually used frequency bandwidth of the random access preamble transmission has to be also known by both the UE and the eNodeB such that the eNodeB will be able to successfully blind decode the random access preamble. In a manner similar to the determination of the minimum frequency bandwidth threshold, the actual preamble transmission frequency bandwidth can be determined by the UE and/or the eNodeB, and information can be exchanged between the two entities if necessary. Details will also become apparent from the detailed description of the various embodiments.

As has been mentioned before in the background section, so far it was agreed that for unlicensed cells only a contention-free RACH procedure shall be supported, the details thereof being described in the background section. Correspondingly, the assumed scenario follows this initial agreement, although it should be noted that the principles of the disclosure according to the different embodiments are likewise applicable to a contention-based RACH procedure. In particular, as will become apparent from below, the different embodiments of the disclosure focus on the transmission of the random access preamble, and thus are equally possible for the contention-based RACH procedure where the UE autonomously selects a suitable random access preamble sequence (from a suitable set of preambles) as well as for the contention-free RACH procedure where the UE receives a corresponding indication from the eNodeB as to which random access preamble sequence (of that set of preambles) shall be used for the random access procedure. In the same manner as explained in the background section, the contention-based RACH procedure might also allow the UE to choose between two subgroups (into which the set of preambles available for the contention-based random access procedure is divided) so as to allow one bit of information to be additionally transmitted, giving information about the amount of transmission resources necessary for transmitting the next message (msg3, 303 in FIG. 3).

For the following embodiments it is further assumed that the random access procedure, with the exception of the transmission (and reception) of the random access preamble might not have to change. Consequently, the overall structure and sequence of the random access procedure as exemplarily discussed in the background section may stay the same while only introducing changes to the random access procedure in relation to the transmission of the random access preamble as discussed in the various embodiments below. For instance, the standardized procedures for triggering the random access procedure, as well as the other messages of the random access procedure (such as the random access response message 302, 403, the scheduled transmission 303, as well as the contention resolution message 304, and the random access preamble assignment 401) might not have to change. In order to avoid repetition, reference is thus made to the corresponding paragraphs in the above background section.

Consequently, it is assumed that the random access procedure is triggered for the unlicensed cell, wherein the following embodiments provide several implementations of an improved random access procedure to be performed for an unlicensed cell.

First Embodiment

In the following a first embodiment for solving the above problem(s) will be described in detail. Different implementations of the first embodiment will be explained below by using the above introduced exemplary scenario.

Figure 5:
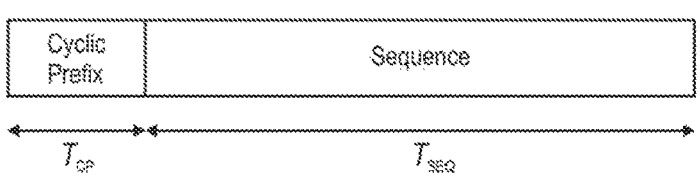
FIG. 5 illustrates the structure of a RACH preamble.
Figure 6:
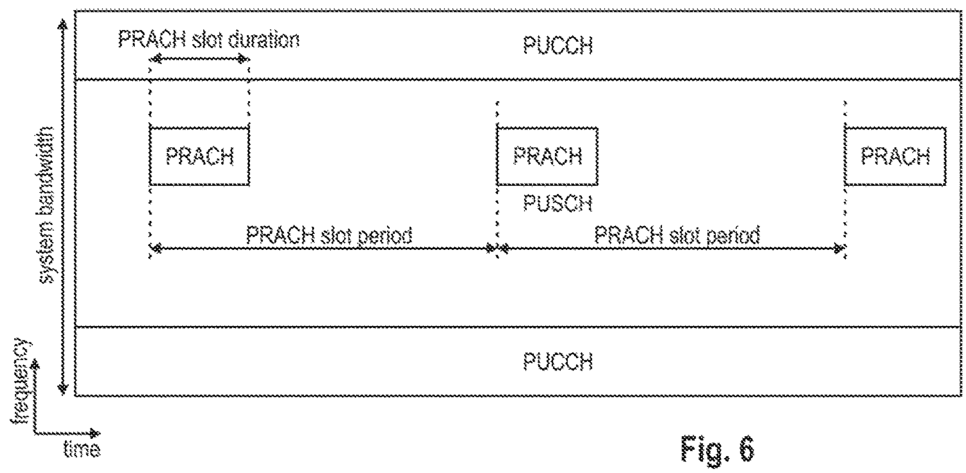
FIG. 6 illustrates the multiplexing of the PRACH transmission with PUSCH and PUCCH.

In brief, according to the first embodiment, the existing definition of how to transmit the random access preamble to the radio base station is reused, but the first embodiment additionally introduces a repetition mechanism as follows. The repetition mechanism in the UE allows the usual transmission of the random access preamble to be repeated at different frequency positions in the frequency domain as often as necessary such that the combined transmissions of the random access preamble occupy at least the necessary frequency bandwidth to comply with the minimum channel occupation requirement defined for the unlicensed cell. Thereby, it is not only possible to reuse as much as possible (and as much as necessary) the existing definition and standardization for the preamble transmission, but at the same time the repetition scheme allows to flexibly adapt the overall PRACH transmission, i.e., including all of the preambles (repetitions), to different bandwidth requirements by simply adding frequency-wise further repetitions of the "standard" PRACH signal until the minimum frequency bandwidth threshold is exceeded. In more detail, in exemplary implementations of the first embodiment, the usual random access procedure as described in detail in the background section for the licensed cells is followed as much as possible. This, for instance includes that the UE will generate a set of random access preambles, in the same manner as described in the background section; thus, for instance including the use of a Zadoff-Chu root sequence explicitly indicated by the eNodeB, from which then the 64 different random access preamble sequences are generated by using cyclic shifts. The thus generated set of random access preambles is not only available to be used for performing a random access procedure via the licensed cell, but shall also be available to be used for performing a random access procedure via the unlicensed cell. Furthermore, the random access preambles may thus also have the same structure as explained in connection with FIG. 5, as well as have the same sequence length for the different preamble formats (i.e., 839 for formats 0-3 or 139 for format 4). The same applies to the subcarrier spacing of 1.25 kHz for preamble formats 0-3 and 7.5 kHz for preamble format 4, which can be equally applied according to this implementation. Also the same PRACH time duration can be assumed as before, i.e., combining $T_{CP}$ and the $T_{SEQ}$.

Assuming the contention-free random access procedure, the UE will receive a corresponding indication from the eNodeB as to which particular random access preamble of the generated set shall be used for the random access procedure. The UE will thus select the indicated random access preamble from the available set of preambles and will then prepare the transmission of same to the eNodeB as follows.

Figure 14A:
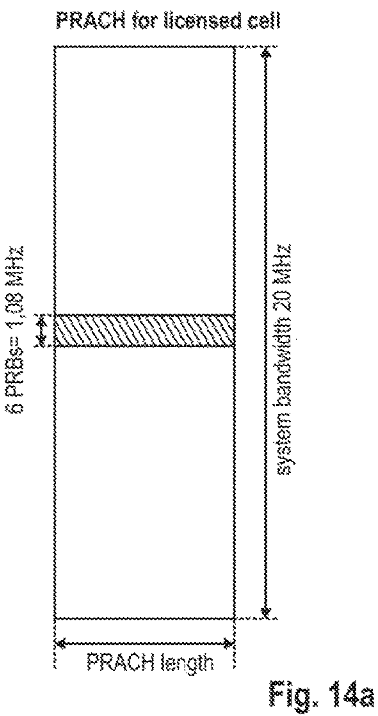
FIGS. 14*a* and 14*b* illustrate the frequency bandwidth of a PRACH signal transmission for a 20 MHz system bandwidth of respectively the licensed and unlicensed cells, according to a first embodiment that uses a repetition mechanism to comply with the minimum channel occupation requirement.
Figure 14B:
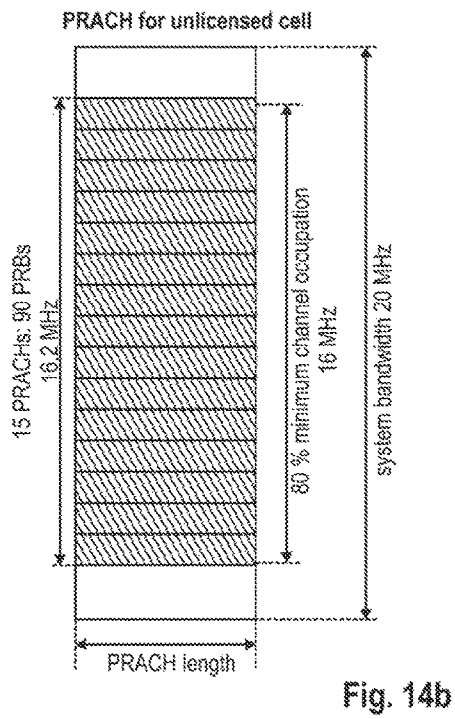

Specific exemplary implementations of the first aspect will now be explained in detail. At first, it is assumed that the licensed and unlicensed cells are set up with a nominal channel bandwidth of 20 MHz (the nominal channel bandwidth can also be termed as "system bandwidth"). The following explanations will be done with reference to FIGS. 14*a* and 14*b* which respectively illustrate a PRACH transmission in the licensed cell and the unlicensed cell performed by a corresponding UE supporting LAA. As apparent from FIG. 14*a*, the transmission of the random access preamble (PRACH) via the licensed cell is performed in the usual 6 PRBs, i.e., having a frequency bandwidth of 1.08 MHz (6×180 kHz). So as to comply with the minimum channel occupation parameter set up in Europe of 80%, a corresponding random access preamble transmission performed via the unlicensed cell would have to at least occupy 16 MHz of the unlicensed cell channel bandwidth (see FIG. 14*b*). In order to achieve this increased channel occupation, the first embodiment suggests introducing a repetition mechanism which repeats the "usual" preamble transmission at different frequency positions thereby composing an overall PRACH transmission which exceeds the minimum frequency bandwidth threshold of 16 MHz. As illustrated in FIG. 14*b*, the usual PRACH transmission may be repeated as often as necessary until the minimum channel occupation of 16 MHz is surpassed. In this particular case, this means that 14 repetitions of the PRACH transmission are to be performed, thus in total transmitting 15 times the usual PRACH, thereby using 90 PRBs occupying 16.2 MHz.

Figure 15A:
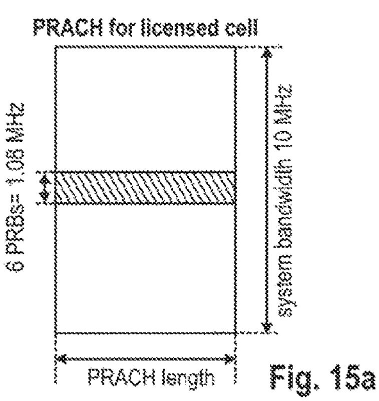
FIGS. 15*a* and 15*b* illustrate the frequency bandwidth of a PRACH signal transmission for a 10 MHz system bandwidth of respectively the licensed and unlicensed cells, according to a first embodiment.

In the following exemplary scenario for FIGS. 15*a* and 15*b*, it is assumed that the licensed and unlicensed cells are set up with a nominal channel bandwidth of 10 MHz.

Correspondingly, the minimum channel occupation of 80% would result in a minimum frequency bandwidth of 8 MHz which the combined random access preamble transmission has to at least occupy. As explained in connection with FIGS. 14*a* and 14*b*, FIG. 15*a* discloses a PRACH transmission via the licensed cell, which spans 6 PRBs in the usual manner. On the other hand as illustrated in FIG. 15*b*, for the unlicensed cell there are 7 repetitions and thus 8 PRACH transmissions occupying a total of 48 PRBs and 8.64 MHz (48×180 kHz).

Figure 15B:
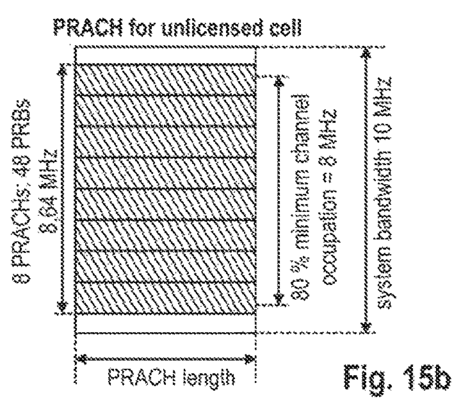

In one particular exemplary implementation, for the different repetitions of the preamble transmission according to FIGS. 14*b* and 15*b*, different offsets φ can be used, which, e.g., could be directly derivable by the UE from the initial offset φ (being 7 or 2, depending on the preamble format) derived from the corresponding table in the background section. The different offsets can be chosen such that the separate preamble transmissions are directly adjacent although without overlapping each other. Alternatively, although not shown in the figures, it might also be possible to allow a slight overlapping of 2 adjacent preamble transmissions such that only one guard band (instead of two guard bands as apparent from FIG. 16) separates the two preamble transmissions. To said end, the frequency offsets for the repetitions have to be set accordingly.

Figure 7:
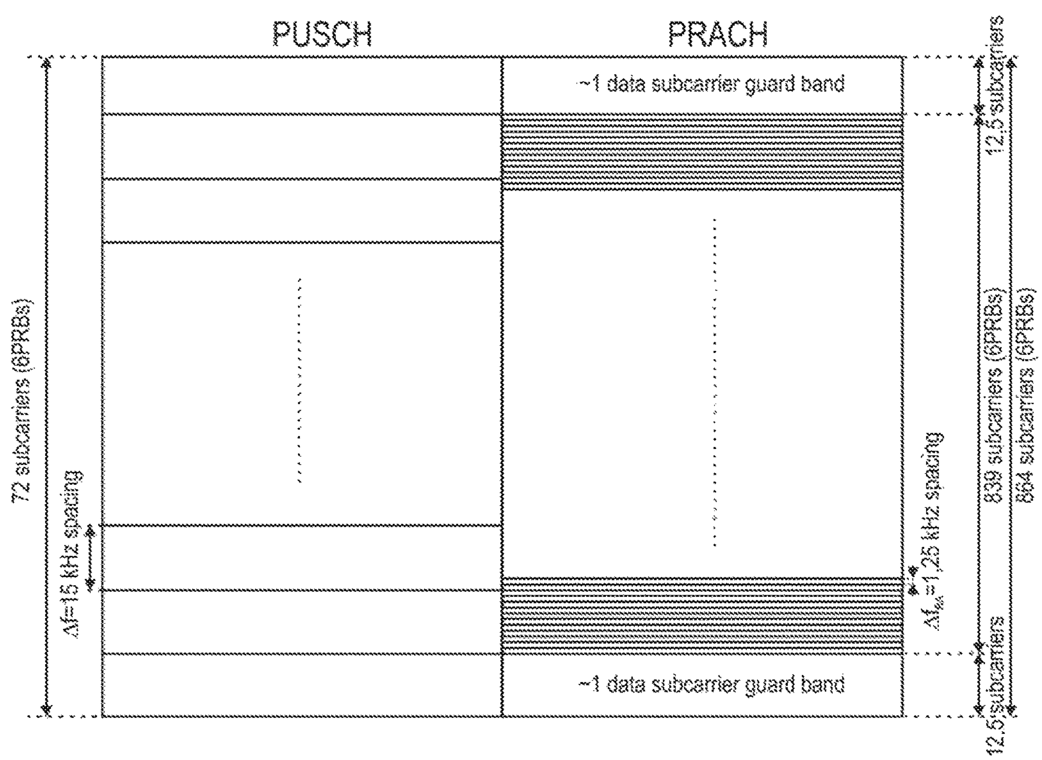
FIG. 7 illustrates the PRACH preamble mapping onto allocated subcarriers.
Figure 9:
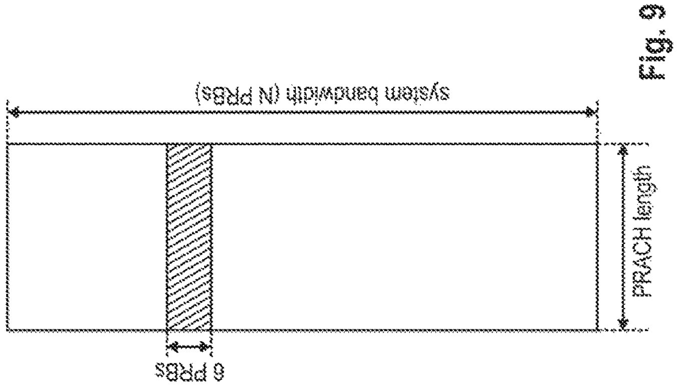
FIGS. 8 and 9 illustrate different locations of the PRACH within the nominal frequency system bandwidth.
Figure 8:
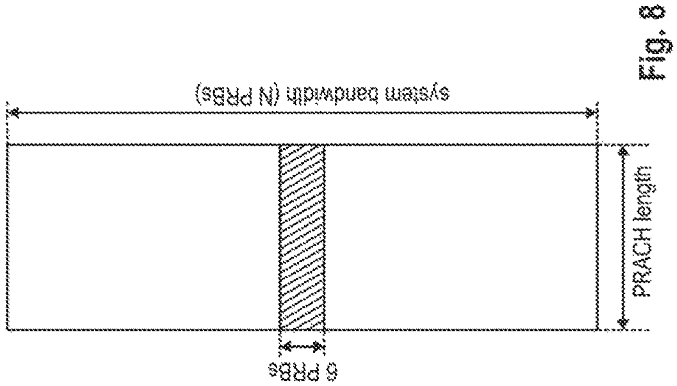
Figure 16:
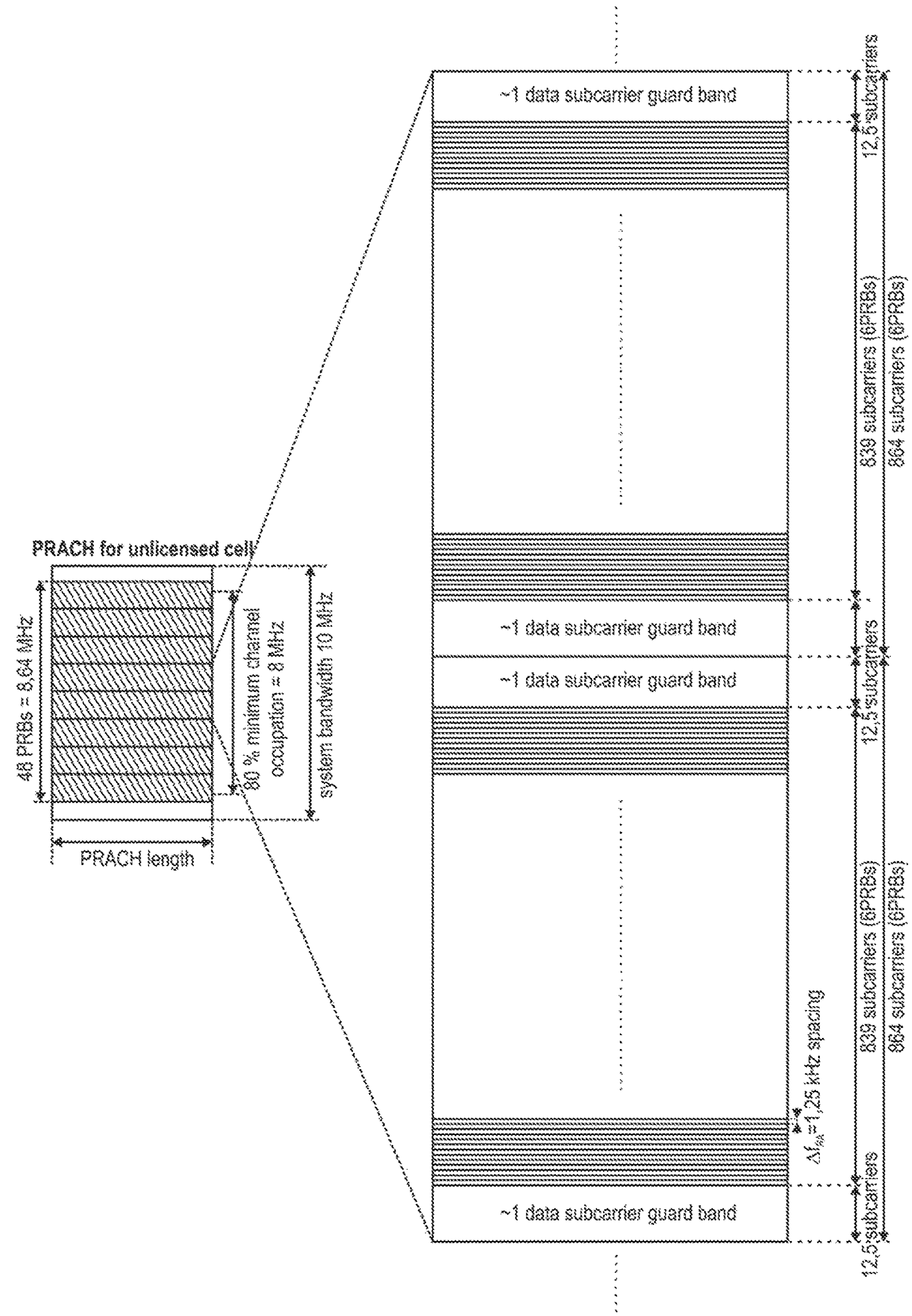
FIG. 16 is based on the implementation of FIG. 15*b* and particularly illustrates the various subcarriers carrying the PRACH signal of two adjacent PRACH transmissions/repetitions, according to a first embodiment.

FIG. 16 is based on the example scenario of FIG. 15*b*, and additionally expands the view so as to illustrate the various subcarriers and guard bands for two adjacent preamble transmissions out of the eighth preamble transmissions. As apparent therefrom, the usual 1.25 kHz subcarrier frequency spacing is assumed with 839 subcarriers composing the PRACH signal (see also FIG. 7 and the corresponding part of the background section).

The necessary number of repetitions necessary to comply with the minimum channel occupation requirement set up for the unlicensed cell can be autonomously determined by the UE and the eNodeB by a simple calculation based on the frequency bandwidth occupied by a usual preamble transmission (i.e., 1.08 MHz) and the minimum frequency bandwidth threshold (e.g., 16 MHz for a 20 MHz system bandwidth or 8 MHz for a 10 MHz system bandwidth). Alternatively, the eNodeB might explicitly indicate to the UE the number of repetitions it shall use when transmitting the preamble. Or, the number of repetitions might be fixed in the standard for the different system bandwidth constellations. As apparent from FIGS. 14*b* and 15*b*, respectively 14 and 7 repetitions are necessary, or put differently respectively 15 and 8 usual PRACH transmissions are necessary for the exemplary assumed scenarios. The eNodeB will thus be able to successfully decode the PRACH transmissions. Alternatively, the number of repetitions for each nominal channel bandwidth could be predefined in the standard and thus known to both the UE and eNodeB.

Figure 17A:
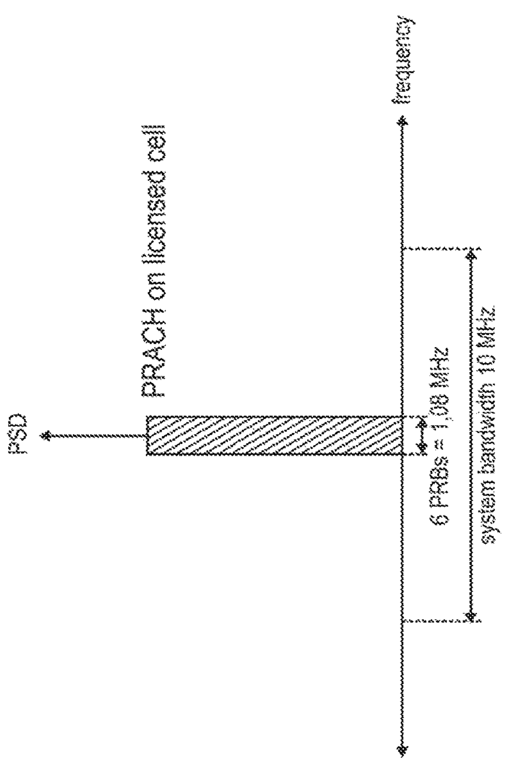
FIGS. 17*a* and 17*b* illustrate the power spectral density respectively of a PRACH transmission via the licensed cell and the improved PRACH transmission via the unlicensed cell according to the first embodiment.
Figure 17B:
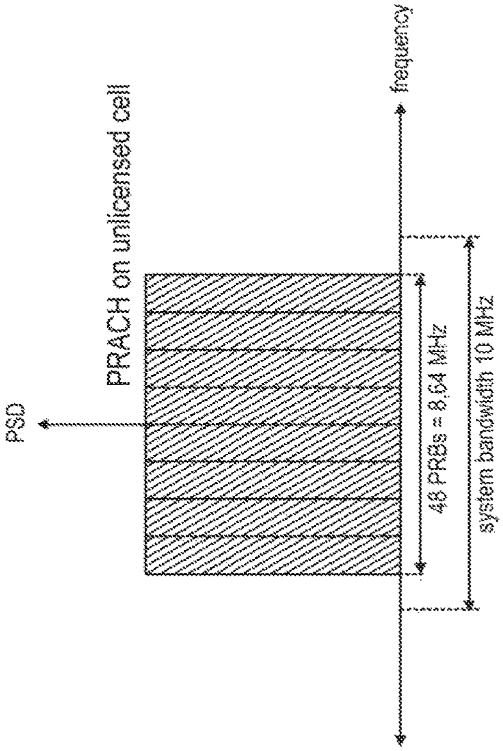

In one exemplary implementation of the first aspect, it is assumed that each of the PRACH transmissions is transmitted by the UE with the same transmission power as used for the usual PRACH transmission (in the licensed cell). In particular, FIG. 17*a* illustrates a PRACH transmission of the UE via the licensed cell having a particular transmission power and power spectral density, the PRACH transmission spanning the usual 6 PRBs and 1.08 MHz. The transmission power is determined in the usual manner, e.g., by an open-loop estimation with full compensation for the path loss. The UE estimates the path loss averaging measurements of the Reference Signal Received Power (RSRP). Correspondingly, FIG. 17*a* illustrates such a PRACH transmission via the licensed cell. In a appropriate manner, FIG. 17*b* illustrates the combined PRACH transmission via the unlicensed cell as described above for the first embodiment in connection with FIG. 15*b*, the transmission spanning 48 PRB and 8.64 MHz. As apparent from FIG. 17*b*, for the present implementation of the first embodiment it is assumed that all the various transmissions of the usual PRACH transmission (i.e., all the repetitions) have the same power spectral density, i.e., are transmitted with the same transmission power. This can be implemented in the UE by applying the same transmission power value configured for the usual PRACH transmission to also the repetitions at the different frequency positions via the unlicensed cell.

Alternatively, instead of using the same transmission power value, the UE might use different transmission power levels to transmit the various PRACH transmissions. For instance, all the various PRACH transmissions may be transmitted with a lower transmission power, e.g., half of the transmission power. One particular way to configure the transmission power is to set a transmission power for each of the various PRACH transmissions such that the overall transmission power (i.e., the transmission power used for transmitting all of the PRACHs, e.g., 8 total transmissions for FIG. 17*b*) is the same as the transmission power used for transmitting one PRACH via the licensed cell. Thus, while the power spectral density is reduced by the total number of PRACH transmission (e.g., PSD/8), the overall transmission power used by the UE for the PRACH transmission stays the same .

Figure 10:
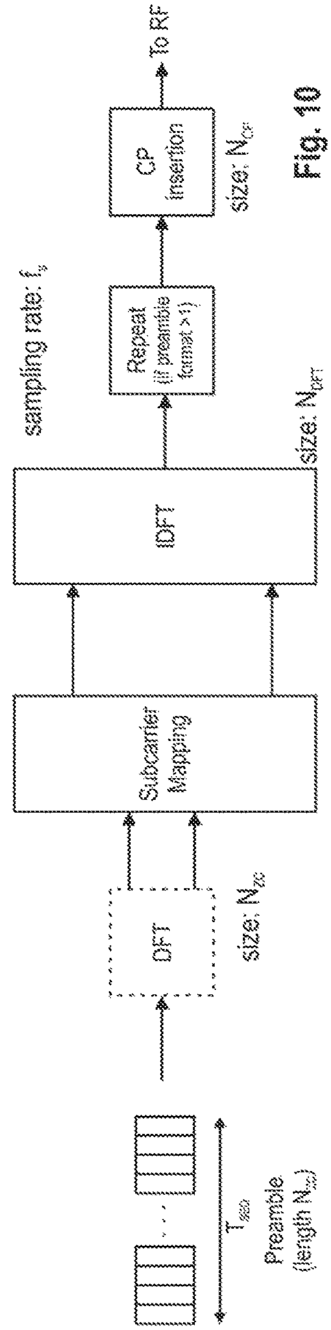
FIG. 10 illustrates an exemplary functional structure of a PRACH preamble transmitter.
Figure 11:
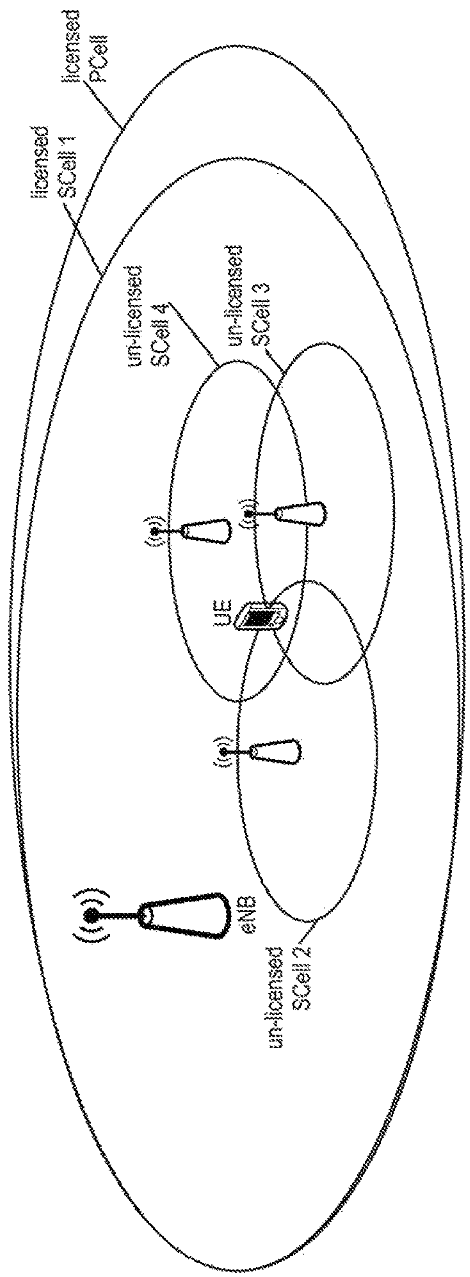
FIG. 11 illustrates an exemplary LAA scenario with several licensed and unlicensed cells.
Figure 12:
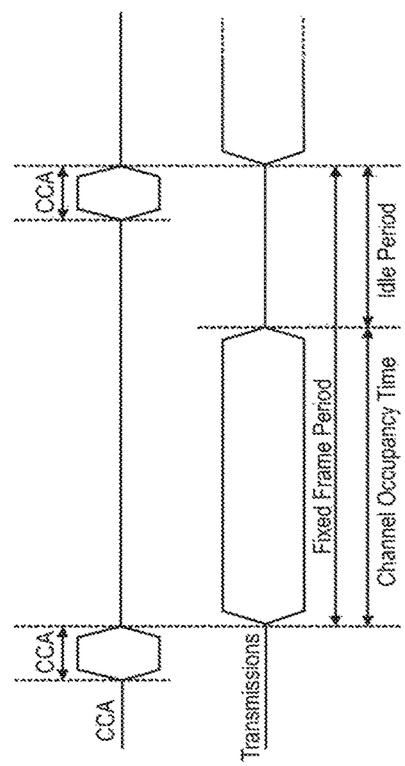
FIG. 12 illustrates the transmission behavior for an LAA transmission.
Figure 13:
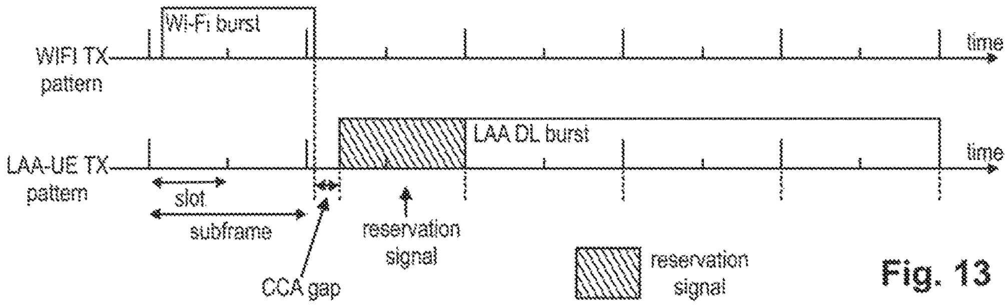
FIG. 13 illustrates the timing between a Wi-Fi transmission and LAA UE downlink burst for an unlicensed cell.
Figure 18:
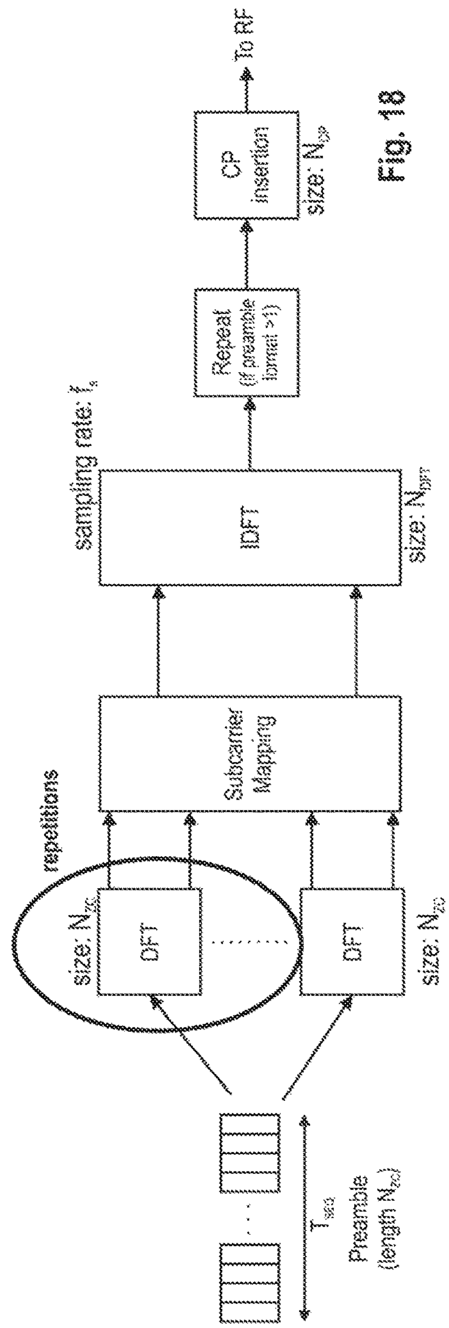
FIG. 18 illustrates an exemplary UE implementation of the transmitter chain according to the first embodiment.

Furthermore, FIG. 18 illustrates an exemplary implementation of the UE transmitter according to the first embodiment, explained in the background section in connection with FIG. 10. As apparent from FIG. 18, the repetition mechanism described above in the various implementations of the first embodiment can be implemented in the transmission chain between the DFT and the subcarrier mapping. The DFT and subcarrier mapping achieve the positioning of the PRACH signal in the frequency domain, and thus the same generated preamble (left part) of length $N_{ZC}$ can be repeated at different frequency positions in the frequency domain by processing the generated preamble in the various DFTs and positioning the resulting frequency samples ($N_{ZC}$) at corresponding frequency positions by the subcarrier mapping as exemplary illustrated in FIGS. 14*b* and 15*b*.

Figure 21:
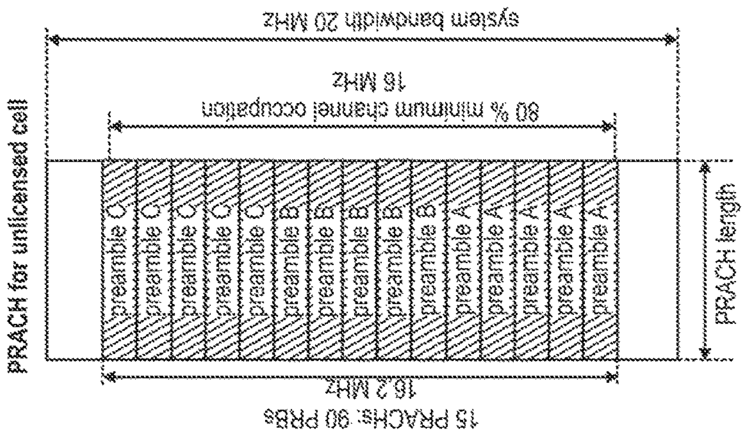
FIGS. 19, 20 and 21 illustrate different repetition patterns according to an improved first embodiment where at least two preambles are selected for being transmitted through the various repetitions.
Figure 19:
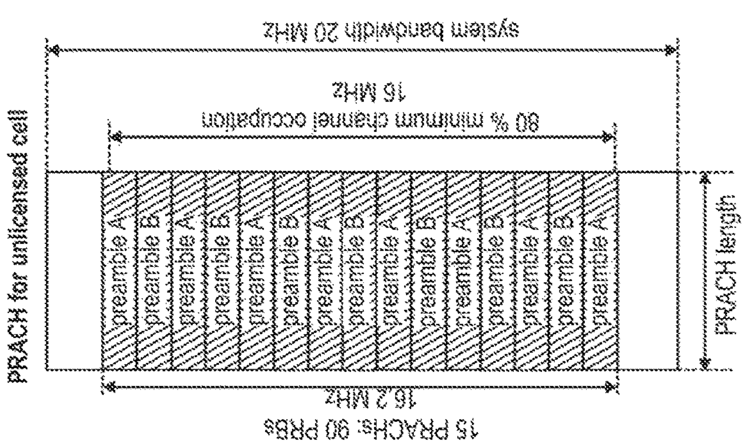

Further implementations of the first embodiment provide improvements by allowing different preamble sequences to be used for different repetitions. These improved implementations will be described in connection with FIGS. 19, 20, and 21. Briefly speaking, by allowing different preamble sequences to be used for different repetitions and by suitably determining different repetition patterns between the eNodeB and the UE, additional information could be encoded into the overall PRACH transmission.

Additional information could comprise for example an indicator for the channel occupation observed by the UE sending the PRACH. The observed channel occupation could be defined by a ratio of successful and unsuccessful CCAs on UE side prior to the PRACH transmission. A threshold could be defined for that ratio such as for example 0.5. The transmitted PRACH could then convey the information whether the ratio is above the defined threshold or equal or below the defined threshold. The eNB can make use of this information when scheduling downlink data transmissions for the UE in the sense that less quality of service can be expected if the ratio is low.

In particular, following the standard procedure for a usual PRACH transmission, in the above implementations of the first embodiment it was assumed that only a single preamble (out of the available preambles) is used for the overall PRACH transmission (including the repetitions) i.e., the same preamble was repeatedly transmitted at a different frequency positions. As such, only one preamble was selected by the UE (e.g., as indicated by a corresponding indication from the eNodeB) and it was used for each of the PRACH transmissions. Further implementations of the first embodiment however allow using two or more different preambles to be transmitted by the UE for the same random access procedure via the unlicensed cell as will be explained in the following.

At first it is assumed that two different preambles are selected by the UE for performing the random access procedure via the unlicensed cell. According to one implementation, the different preambles can both be indicated separately by the eNodeB. Alternatively, or in addition, a fixed association between the different preambles can be defined, such that upon being indicated one particular random access preamble by the eNodeB (or upon autonomously selecting one random access preamble in case of contention-based RACH), the UE will correspondingly select further random access preamble(s) associated with the indicated (or autonomously selected) random access preamble. The particular association can be optimized so as to increase the transmission performance by appropriately defining the associations such that the PAPR (Peak-to-Average Power Ratio) or CM (Cubic Metric) of the overall transmission is minimized.

Figure 20:
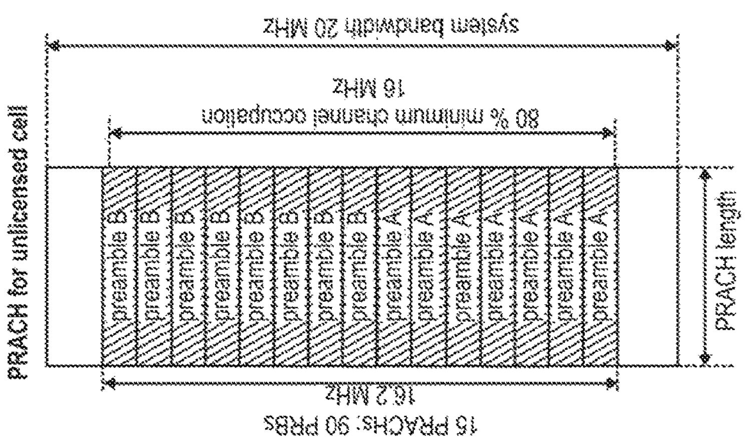

Therefore, different preambles are used for performing different PRACH transmissions. In the exemplary scenario of FIG. 19 assuming a system bandwidth of 20 MHz, preambles A and B are used alternately in the frequency domain, thus giving a repetition pattern of ABABAB AB . . . for transmitting the 15 PRACH transmissions. Another exemplary repetition pattern is illustrated in FIG. 20 assuming as well two different preambles A and B, where preamble A is used for (approximately) one half of the total frequency bandwidth of the combined PRACH transmission, and preamble B is used for the other half (i.e., AAAAAAABBBBBBBB). For the exemplary implementation of FIG. 21, a total of three different preambles is assumed, preambles A, B, C, with the exemplary illustrated repetition pattern AAAAABBBBBCCCCC.

In one exemplary implementation, the repetition pattern to be used can be selected by the UE, e.g., from a limited number of preconfigured repetition patterns. The number of preconfigured repetition patterns could for instance be configured by the eNodeB and accordingly informed to the UE(s) in its cell, or could be fixed in the standard.

Each of the preconfigured repetition patterns may for instance be associated with one particular information, such that the selection of the particular repetition pattern by the UE already encodes a particular information. For instance, the eNodeB, when blind decoding the PRACH repetitions, will successfully decode the various PRACH transmissions according to the repetition pattern chosen by the UE and will thus derive the encoded information.

Information on the necessary transmission resources could be relevant information for being encoded by the repetition pattern. When assuming two different repetition patterns that could be used by the UE, one repetition pattern could be associated with a larger amount of transmission resources while the other repetition pattern could be interpreted to indicate that only a small amount of transmission resources are necessary for the UE.

Other important information could be the observed channel occupation statistics from UE-point of view as described above. The pattern ABABABAB . . . could for example indicate a channel occupation ratio of more than 0.5, while the pattern BABABABA . . . could indicate a channel occupation ratio of equal to or less than 0.5.

Second Embodiment

In the following a second embodiment for solving the above problem(s) will be described in detail. The principle behind the second embodiment is quite different to the repetition mechanism explained in connection with the first embodiment. Different implementations of the second embodiment will be explained in detail below by using the above introduced exemplary scenario.

In brief, instead of performing various repetitions of the usual PRACH signal as in the first embodiment, for the second embodiment one or more configuration parameters for transmitting the PRACH signal are adapted so as to spread the signal over the necessary frequency bandwidth, i.e., so as to comply with the minimum channel occupation requirement for unlicensed cells. The configuration parameters are the length of the RACH preamble sequence (i.e., $N_{ZC}$) and the subcarrier frequency spacing for the subcarriers used for transmitting the RACH preamble (i.e., $\Delta f_{RA}$). These two parameters in combination basically define the total frequency bandwidth of the PRACH signal transmission. As explained in the background section, the frequency bandwidth of the usual PRACH transmission is independent from the system bandwidth of the channel on which it is transmitted and always 1.08 MHz. For instance, for preamble format 0-3 the subcarrier frequency spacing is 1.25 kHz with 864 subcarriers (839 subcarriers+2×12.5 subcarriers for the guard bands) (see FIG. 7) having thus a frequency bandwidth of 1.08 MHz; for preamble format 4, the subcarrier frequency spacing is 7.5 kHz with 144 subcarriers (139 subcarriers+2×2.5 subcarriers for the guard bands) again having a frequency bandwidth of 1.08 MHz. It should be noted that the number of subcarriers used for transmitting the PRACH signal is the same as the preamble sequence length $N_{ZC}$, since the preamble sequence is first converted into $N_{ZC}$ frequency samples that are respectively mapped to corresponding $N_{ZC}$ subcarriers. This implementation approach is typically applied in LTE since it is a property of ZC sequences that the DFT of such a sequence is again a weighted cyclically-shifted ZC sequence. It should furthermore be noted that, when the length of the preamble sequence is a prime number, optimum cyclic cross-correlation between any pair is achieved.

Thus, by suitably selecting different values for these two parameters, the frequency bandwidth of the PRACH transmission can be controlled so as to comply with the minimum channel occupation requirements set up for unlicensed cells. To said end, either one of the two parameters or both of them can be changed when compared to the usual/legacy PRACH signal performed for unlicensed cells. A lot of different combinations are possible for these two parameters ($N_{ZC}$ and $\Delta f_{RA}$) also depending on the actual minimum frequency bandwidth threshold that the PRACH signal transmission has to at least occupy.

Figure 22A:
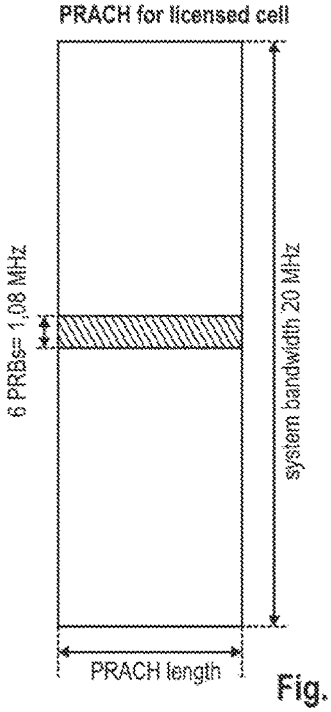
FIGS. 22*a* and 22*b* illustrate the frequency bandwidth of a PRACH signal transmission for a 20 MHz system bandwidth of respectively the licensed and unlicensed cells, according to a second embodiment that adapts parameters of the PRACH signal transmission to comply with the minimum channel occupation requirement.
Figure 22B:
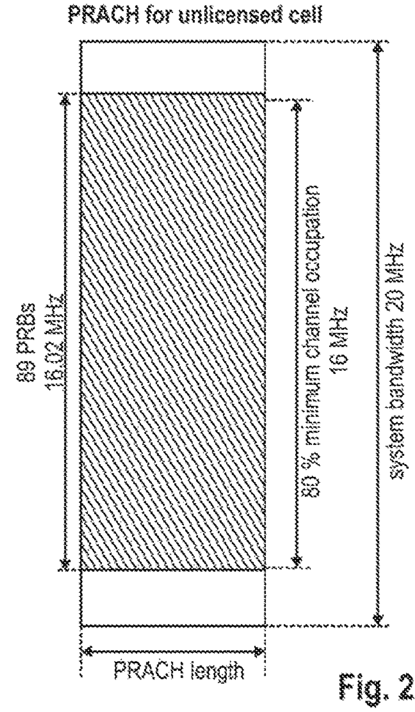
Figure 23A:
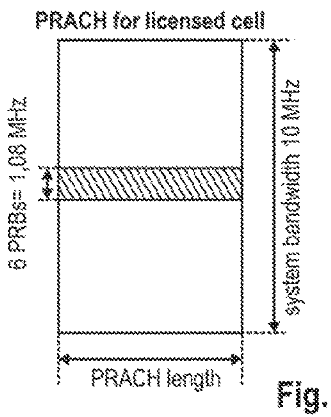
FIGS. 23*a* and 23*b* illustrate the frequency bandwidth of a PRACH signal transmission for a 10 MHz system bandwidth of respectively the licensed and unlicensed cells, according to a second embodiment.

In the following, the two different system bandwidths of 10 MHz and 20 MHz will be assumed as already done for the first embodiment, respectively being illustrated in FIGS. 22 and 23. Further assuming the same minimum channel occupation requirement of 80% for Europe, a minimum frequency bandwidth threshold of respectively 8 MHz and 16 MHz is thus to be complied with when performing a random access procedure via the unlicensed cell, e.g., when transmitting the preamble from the UE to the eNodeB as part of the random access procedure.

For example, the subcarrier frequency spacing could be maintained the same 1.25 kHz as for the usual/legacy PRACH transmission of preamble formats 0-3 (or 7.5 kHz for preamble format 4), thus leaving only the preamble sequence length as the parameter to control depending on the determined minimum frequency bandwidth threshold. In the case of 1.25 kHZ and the 8 MHz frequency bandwidth threshold, at least 6400 subcarriers are "necessary" to achieve a PRACH signal with a frequency bandwidth of 8 MHz. For an improved preamble design that maximizes the number of ZC sequences with optimal cross-correlation properties, prime-length preamble sequences should be chosen. Thus, in the just-explained case a preamble length of 6421 could be chosen, which then results at a frequency bandwidth of 8.026 MHz.

On the other hand, the preamble sequence length, and thus the number of subcarriers for transmitting the preamble signal, can be maintained the same (i.e., 839 for preamble formats 0-3 and 139 for preamble format 4) as for the usual/legacy PRACH transmission. In this particular case, it is possible to change the frequency bandwidth of the PRACH signal by adapting the subcarrier frequency spacing parameter. For instance, in the case of a preamble of length 839, (in total 864 subcarriers with the additional subcarriers for the two guard bands) and the 8 MHz frequency bandwidth threshold, a subcarrier frequency spacing of at least 9.26 kHz is necessary.

Alternatively, both the preamble length and the RACH subcarrier frequency spacing can be changed so as to comply with the minimum channel occupation requirement. In the above discussed case of having a 10 MHz system bandwidth for the unlicensed cell, the subcarrier frequency spacing of 7.5 kHz could be assumed, which would make it necessary having at least 1067 subcarriers in total for the PRACH signal (including the actual preamble subcarriers and the additional subcarriers for the guard bands).

In general it should be noted that in order to minimize the orthogonality loss in the frequency domain between the preamble subcarriers and the subcarriers of the surrounding uplink data transmissions, the subcarrier frequency spacing adopted for the PRACH transmission should be an integer fraction of the subcarrier frequency spacing used for the PUSCH transmission (i.e., 15 kHz), such as 1, 2.5, 3, 5, 7.5 or 15 kHz. Or put the other way around, the subcarrier spacing of the PUSCH should be an integer multiple of the PRACH subcarrier spacing. Furthermore, in order to facilitate PRACH and PUSCH multiplexing, a PRACH should be allocated a frequency bandwidth equal to an integer multiple of that of the resource blocks, i.e., an integer multiple of 180 kHz. Furthermore, for an improved preamble design that maximizes the number of ZC sequences with optimal cross-correlation properties, prime-length preamble sequences should be chosen. The just explained design constraints so as to obtain optimized results can more easily be achieved when having both parameters, i.e., the preamble length and the subcarrier frequency spacing, variable as will be discussed below.

Figure 25:
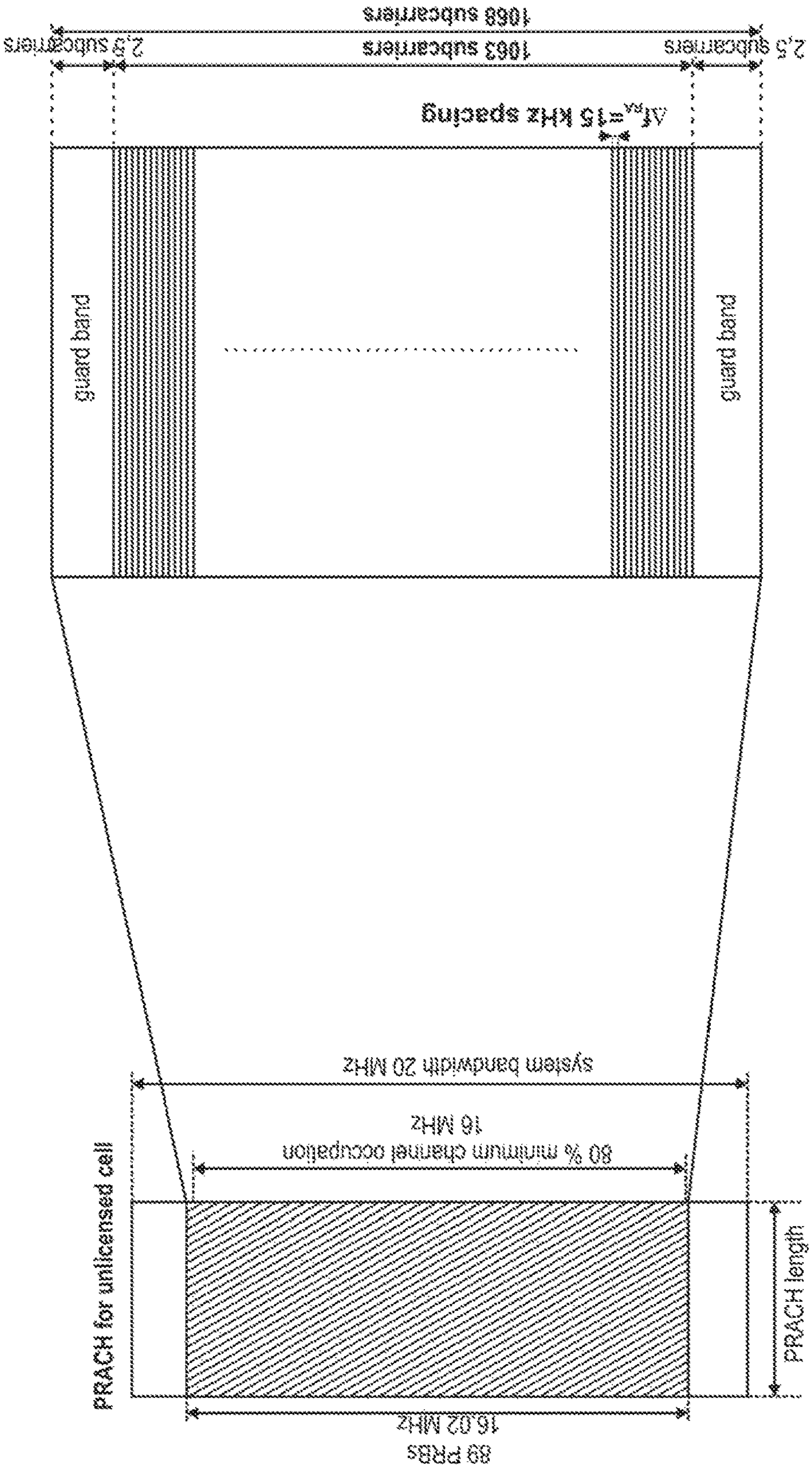
FIGS. 25 and 26 are respectively based on FIGS. 22 and 23 and particularly illustrate the various subcarriers carrying the PRACH signal according to the second embodiment.

At first, a system with an unlicensed cell having a system bandwidth of 20 MHz is assumed, with the corresponding minimum frequency bandwidth threshold of 16 MHz. Taking into account that the resulting frequency bandwidth of the PR ACH transmission signal should be a multiple of the resource block bandwidth of 180 kHz, a total frequency bandwidth for the PRACH signal of 16.02 MHz could be assumed spanning 89 PRBs, thereby facilitating the frequency multiplexing of the PRACH and the PUSCH as mentioned above. In an exemplary implementation, a subcarrier frequency spacing of 15 kHz can be determined, which thus results in a number of subcarriers of 1068. The nearest prime number below 1068 is 1063, such that 5 subcarriers can be foreseen for the 2 guard bands, i.e., 2,5 subcarriers each. This exemplary implementation of a PRACH signal according to the second embodiment is illustrated in FIGS. 22*b* and 25. In such a configuration of the PRACH transmission signal, the subcarrier frequency spacing is an integer fraction of the PUSH subcarrier frequency spacing which minimizes the orthogonality loss in the frequency domain, and the preamble sequence length is a prime number which increases the cross-correlation properties.

Figure 23B:
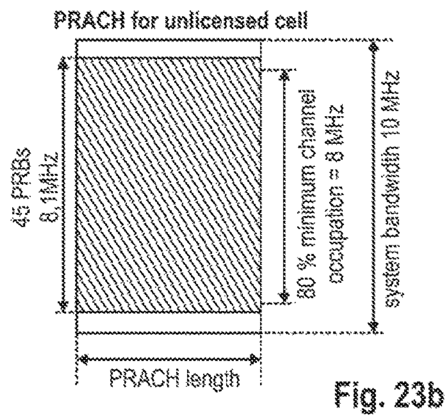
Figure 26:
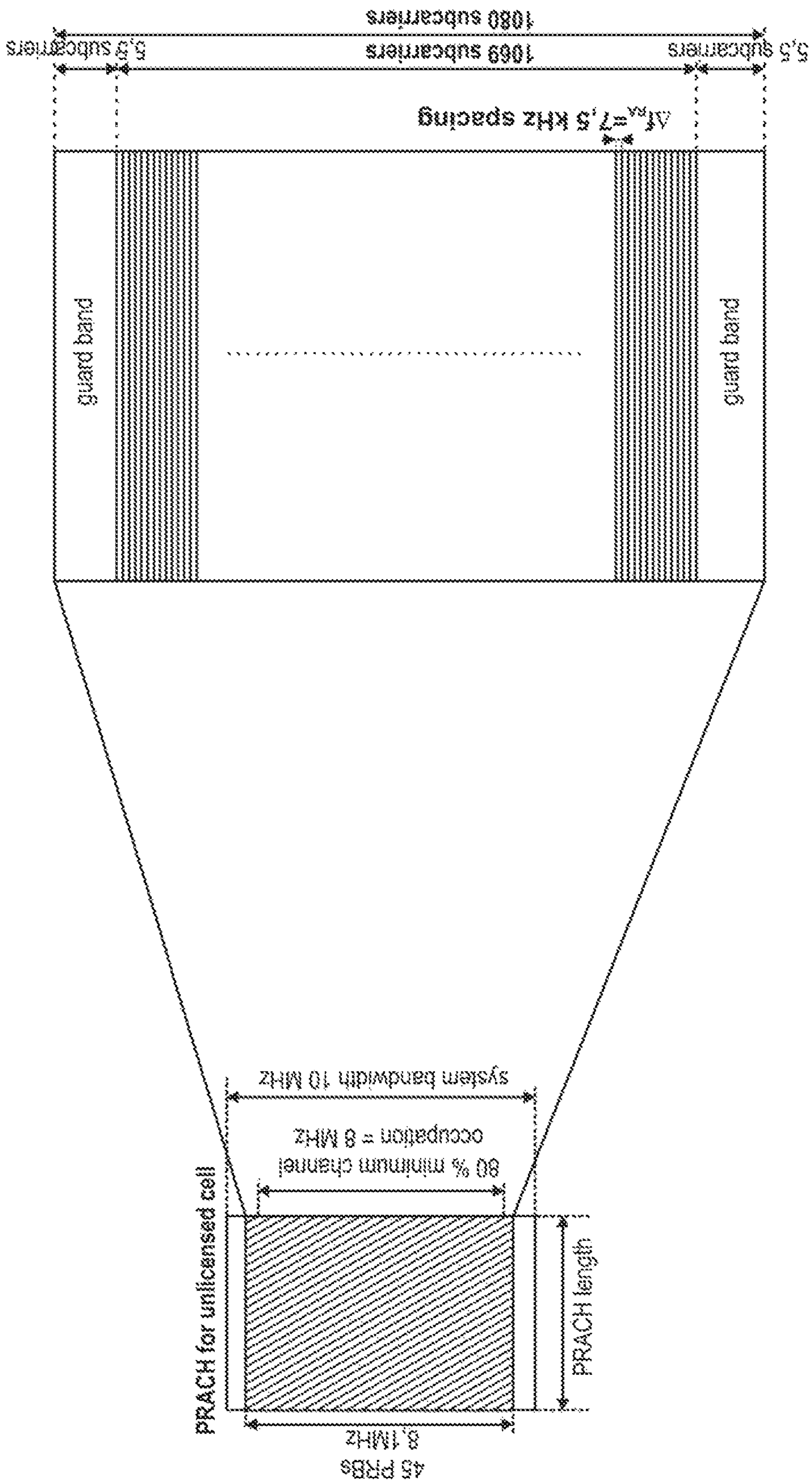

Next, an exemplary system having a 10 MHz system bandwidth for the unlicensed cell is assumed with a corresponding minimum frequency bandwidth threshold of 8 MHz. Taking into account that the resulting bandwidth of the PRACH transmission signal should be a multiple of the resource block bandwidth of 180 kHz, a total frequency bandwidth for the PRACH signal of 8.1 MHz could be envisioned spanning 45 PRBs in total. A subcarrier frequency spacing of 7.5 kHz could be assumed. This results in a total of 1080 subcarriers for the PRACH signal (including the actual preamble subcarriers and the additional subcarriers for the guard bands). The nearest prime number below 1080 is 1069, such that 11 subcarriers can be foreseen for the two guard bands, i.e., 5.5 subcarriers each. This exemplary implementation of a PRACH signal according to the second embodiment is illustrated in FIGS. 23*b* and 26.

As an alternative for the 20 MHz system, the prime number of 1069 could be chosen for the preamble sequence length, the same length as for a 10 MHz system, such that the same preambles can be used for both unlicensed cell bandwidths, which has the advantage that the UE avoids having to provide preambles of different sequence lengths for supporting the two system bandwidths. Correspondingly, assuming that the total frequency bandwidth should cover 16.2 MHz (i.e., covering 90 PRBs with each 180 kHz), 1080 subcarriers, each having 15 kHz, are to be used in total for transmitting the PRACH signal. This results in 5,5 subcarriers per guard band. In both exemplary implementations the preamble length of respectively 1069 and 1063, which also influences the size of the DFT, IDFT (see FIG. 27) is not increased very much when compared to the preamble length of 839 already foreseen for legacy PRACH. By keeping the preamble sequence length relatively low, the DFT and IDFT operation complexity is not increased too much.

A similar approach can be applied so as to configure the parameters to be used for transmitting the PRACH signal for unlicensed cells having different system bandwidths, such as 40 MHz.

In summary, as has been described above, there are several ways on how to set the preamble sequence length and the RACH subcarrier frequency spacing so as to achieve that the frequency bandwidth of the resulting PRACH transmission signal exceeds the minimum frequency bandwidth threshold imposed on unlicensed cells. The corresponding parameter(s) can be chosen either by the UE or the eNodeB, wherein in the latter case the eNodeB would have to instruct the UE accordingly.

In one particular implementation, different parameter combinations are preconfigured for the different system bandwidths, for instance the parameter combinations described above such that for a system bandwidth of 20 MHz, a preamble length of 1069 and a subcarrier frequency spacing of 15 kHz could be chosen. Correspondingly, for a system bandwidth of 10 MHz, a preamble length of 1069 and a subcarrier frequency spacing of 7 kHz could be chosen.

As explained above, according to the second embodiment the sequence length of the preamble may be changed as a function of the system bandwidth, i.e., the corresponding minimum frequency bandwidth threshold. Correspondingly, it is likely that the particular preambles, having a fixed length of 839 or 139, generated for performing the random access procedure via the licensed cell may not be reused for performing the random access procedure via an unlicensed cell. Correspondingly, in one particular implementation of the second embodiment, at least a further set of random access preambles could be generated for this purpose, such that different sets of preambles are available for performing the random access procedure either via the licensed cell or via the unlicensed cell. Following the above described exemplary implementations of the second embodiment, a further set of preambles could be generated having a sequence length of 1069. For example, a suitable root sequence with a sequence length of 1069 could be provided (e.g., by the eNodeB and indicated to the UE) from which a particular number of different preambles could be generated by the UE by performing cyclic shifts. For example, 64 different preambles of length 1069 could be generated by performing cyclic shifts of the corresponding root sequence. On the other hand, taking into account that less random access procedures will likely be performed via the unlicensed cells, also less preambles could be generated for the set, e.g., only 16.

Figure 24A:
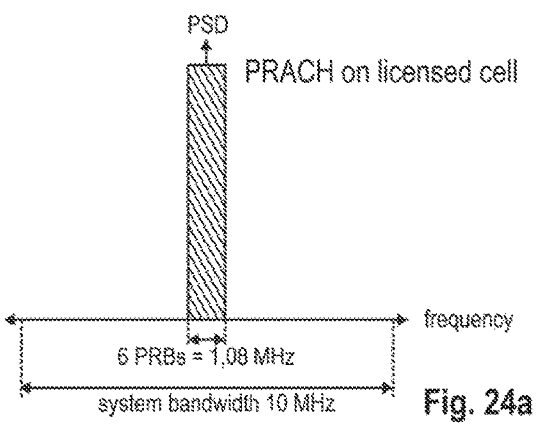
FIGS. 24*a* and 24*b* illustrate the power spectral density respectively of a PRACH transmission via the licensed cell and the improved PRACH transmission via the unlicensed cell according to the second embodiment.
Figure 24B:
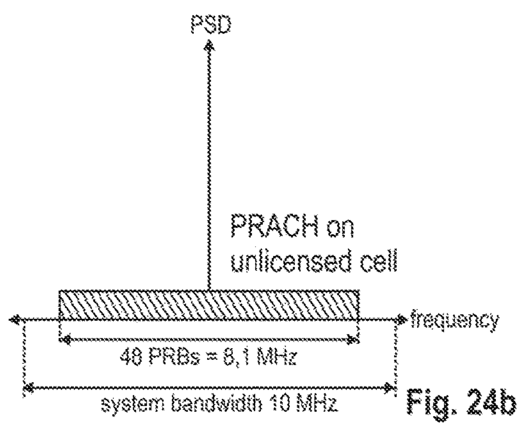

In one exemplary implementation of the second aspect, it is assumed that the PRACH transmission via the unlicensed cell is performed using the same transmission power as configured for the usual PRACH transmission via the licensed cell. A corresponding illustration of this is presented in FIGS. 24*a* and 24*b*. As can be seen from FIG. 24*b*, the power spectral density for the PRACH transmission via the unlicensed cell is greatly reduced when compared to the corresponding PRACH transmission via the licensed cell as illustrated in FIG. 24*a*. Alternatively, the PRACH transmission via the unlicensed cell could be transmitted with a different transmission power value, be it higher or lower than the one used for the PRACH transmission via the licensed cell. For instance, the transmission power could be increased so as to achieve basically the same power spectral density over the enlarged frequency bandwidth as for the transmission of the usual PRACH transmission via the licensed cell (see FIG. 24*a*). On the other hand, the transmission power for PRACH transmissions via the unlicensed cell could also be reduced compared to PRACH transmissions via the licensed cell if the licensed cell is a macro cell with large coverage area compared to an unlicensed cell with small coverage area.

Figure 27:
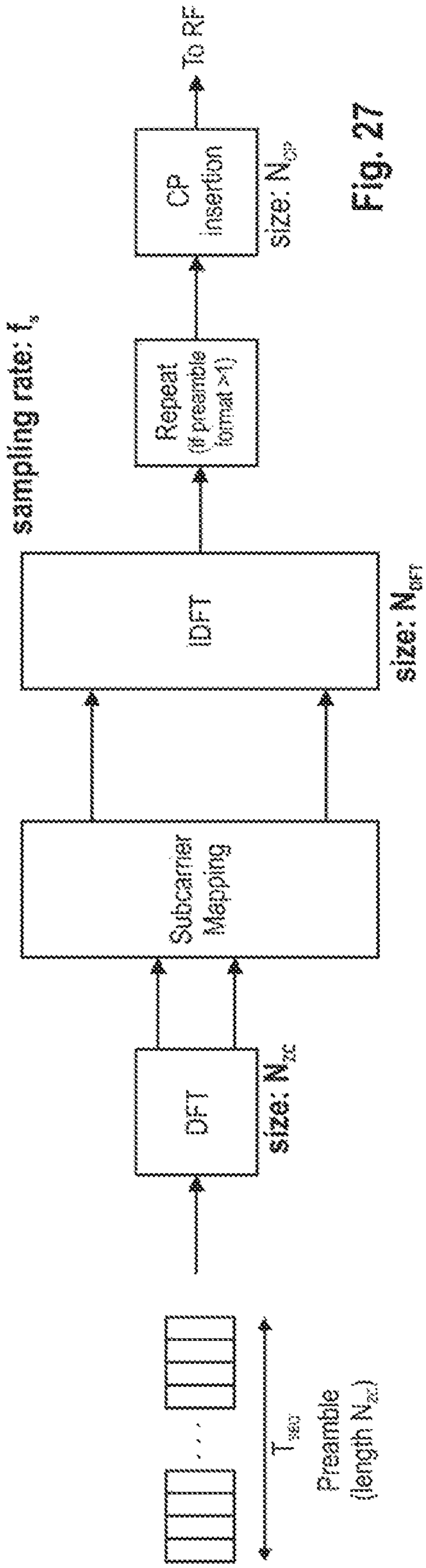
FIG. 27 illustrates an exemplary UE implementation of the transmitter chain according to the second embodiment.

Furthermore, FIG. 27 illustrates an exemplary implementation of the UE transmitter according to the second embodiment, which is similar to the one described in the background section in connection with FIG. 10. The above described principles behind the second embodiment do not require a substantial change in the transmission chain of the UE. Rather, different values for the size of the DFT and IDFT as well as the sampling rate $f_s$ are to be applied for processing a suitable preamble to be transmitted via the unlicensed cell. The size of the DFT and IDFT directly corresponds to the sequence lengths of the preamble.

Third Embodiment

In the following a third embodiment for solving the above problem(s) will be described in detail. This third embodiment is basically a combination of the first and second embodiments thus allowing to combine the two principles in the best manner. Put briefly, one of the improved PRACH transmissions described by the second embodiment can be repeated according to the repetition mechanism as introduced by the first embodiment.

For instance, the third embodiment might be most advantageous for large system bandwidths of, e.g., 40 MHz, so as to keep the RACH subcarrier frequency spacing at or below 15 kHz (as for the PUSCH) while not having to increase too much the preamble length which may be detrimental for the generation of the preambles and the implementation of the UE transmitter, particularly the DFT and the IDFT. As an example, assuming a system bandwidth of 40 MHz for the unlicensed cell, according to the third embodiment, the PRACH signal as explained in connection with FIG. 22*b* can be assumed which then could be repeated once (i.e., being transmitted twice in total) so as to comply with the minimum channel occupation of 80% of the 40 MHz system bandwidth of the unlicensed cell.

Figure 28:
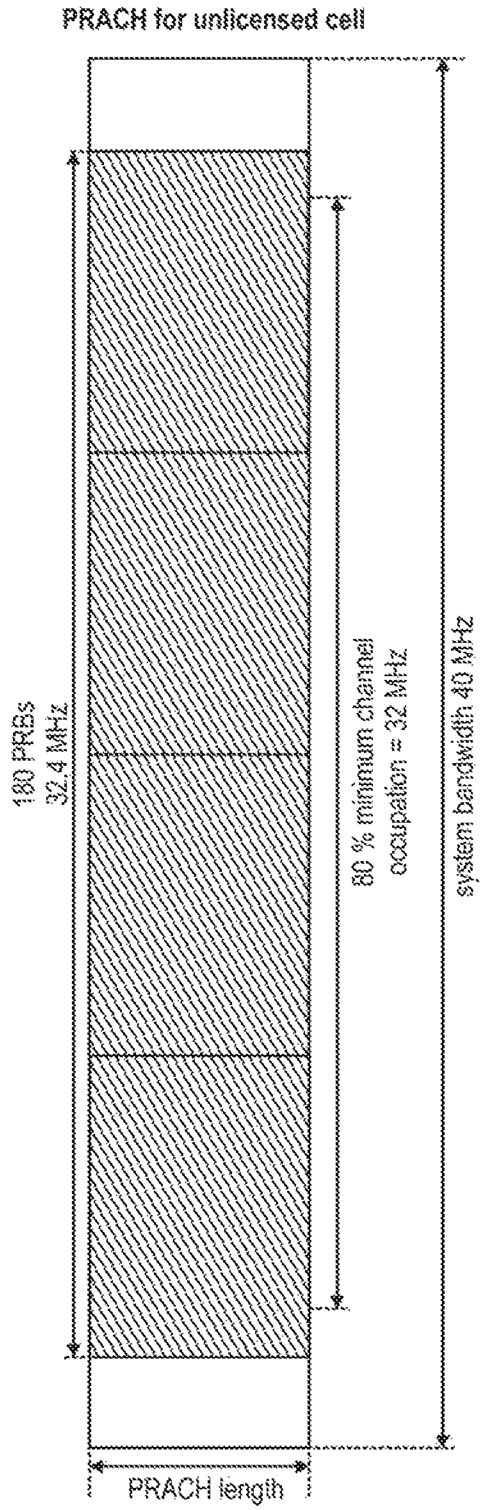
FIG. 28 illustrates the frequency bandwidth of PRACH signal transmission for a 40 MHz system bandwidth according to a third embodiment which combines the first and second embodiments.

Another example is illustrated according to FIG. 28, where it is assumed that a PRACH signal with a frequency bandwidth of 8.1 MHz (see FIG. 23*b*, 26) is used and repeated three times, such that the combined PRACH transmission of in total four PRACHs covers the sufficient frequency bandwidth of more than 32 MHz.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for performing a random access procedure between a user equipment and a radio base station in a mobile communication system, wherein the user equipment is configured with at least one unlicensed cell, the random access procedure being performed via the unlicensed cell having an unlicensed cell frequency bandwidth, wherein a minimum frequency bandwidth threshold is defined for transmissions via the unlicensed cell, and wherein the method comprises the following steps performed by the user equipment for the random access procedure:

selecting a random access preamble sequence for the random access procedure, determining a frequency bandwidth for transmitting the random access preamble sequence via the unlicensed cell, the determined frequency bandwidth being at least the minimum frequency bandwidth threshold, and transmitting the random access preamble sequence to the radio base station such that at least the determined frequency bandwidth of the unlicensed cell is occupied.

2. The method according to claim 1, wherein a transmission of a random access preamble sequence via a licensed cell occupies a predetermined frequency bandwidth, wherein the step of transmitting the random access preamble sequence via the unlicensed cell comprises:

repeating the transmission of the generated random access preamble sequence at different positions in the frequency domain so as to occupy at least the determined frequency bandwidth of the unlicensed cell, wherein the user equipment determines a number of repetitions necessary for occupying the determined frequency bandwidth of the unlicensed cell, the determination being based on the determined frequency bandwidth for transmitting the random access preamble sequence via the unlicensed cell and on the predetermined frequency bandwidth for transmitting the random access preamble sequence via the licensed cell, and wherein the repeated transmissions of the generated random access preamble sequence are adjacent in the frequency domain.

3. The method according to claim 2, further comprising the steps of:

selecting at least a second random access preamble sequence, different from the random access preamble sequence, and transmitting the at least second random access preamble sequence to the radio base station, wherein the step of transmitting the at least second random access preamble sequence via the unlicensed cell comprises repeating the transmission of the generated at least second random access preamble sequence at different positions in the frequency domain, wherein the step of transmitting the random access preamble sequence and the at least second random access preamble sequence are performed together such that at least the determined frequency bandwidth of the unlicensed cell is occupied, and wherein the step of selecting the second random access preamble sequence is based on an association between the second random access preamble sequence and the random access preamble sequence.

4. The method according to claim 1, wherein a set of random access preamble sequences is generated by the user equipment available for performing the random access procedure via the unlicensed cell and via one of at least one licensed cell with which the user equipment is further configured, wherein the step of selecting the random access preamble sequence selects one random access preamble sequence from the generated set, and wherein, when performing a random access procedure via the licensed cell, the user equipment selects a third random access preamble sequence from the generated set and transmits the selected third random access preamble sequence via the licensed cell to the radio base station occupying a predetermined frequency bandwidth of the licensed cell.

5. The method according to claim 1, wherein the step of transmitting the random access preamble sequence is performed with a length of the random access preamble sequence and a subcarrier frequency spacing for frequency subcarriers used for transmitting the random access preamble sequence such that the transmission of the random access preamble sequence occupies at least the determined frequency bandwidth, wherein the length of the random access preamble sequence corresponds to the number of frequency subcarriers used for transmitting the random access preamble sequence, and the frequency subcarriers used for transmitting the random access preamble sequence are spaced apart from each other by the subcarrier frequency spacing, wherein the subcarrier frequency spacing is an integer fraction of a subcarrier frequency spacing for frequency subcarriers used for transmitting a data channel, and wherein the length of the random access preamble sequence and/or the subcarrier frequency spacing for the random access preamble sequence are/is determined based on the minimum frequency bandwidth threshold by either the user equipment or by the radio base station which indicates them/it to the user equipment.

6. The method according to claim 5, wherein a first set of random access preamble sequences is generated by the user equipment for performing the random access procedure via the unlicensed cell, wherein the step of selecting the random access preamble sequence selects one random access preamble sequence of the generated set, wherein a second set of random access preamble sequences is generated by the user equipment for performing the random access procedure via one of at least one licensed cell with which the user equipment is further configured, wherein, when performing a random access procedure via the licensed cell, the user equipment selects a fourth random access preamble sequence from the second set and transmits the selected fourth random access preamble sequence via the licensed cell to the radio base station occupying a predetermined frequency bandwidth of the licensed cell, and wherein the predetermined frequency bandwidth is 1,08 MHz comprising either 839 subcarriers with a 1,25 kHz subcarrier frequency spacing or 139 subcarriers with a 7,5 kHz subcarrier frequency spacing.

7. The method according to claim 5, wherein each random access preamble sequence of the first set is generated by respectively performing a different cyclic shift of a root sequence, and wherein the root sequence and/or the length of the root sequence to be used by the user equipment to generate the set of random access preamble sequences are/is indicated by the radio base station.

8. The method according to claim 5, wherein a transmission power is configured for transmitting random access preamble sequences via a licensed cell, and the transmission of the random access preamble via the unlicensed cell is performed either:

with the transmission power configured for transmitting random access preamble sequences via the licensed cell, or with a transmission power that is increased compared to the transmission power configured for transmitting random access preamble sequences via the licensed cell, wherein the increase of the transmission power is such that a power density over the determined frequency bandwidth stays the same as for the transmission of random access preamble sequences via the licensed cell.

9. The method according to claim 1, wherein the minimum frequency bandwidth threshold is determined:

by the user equipment as a predetermined percentage of the unlicensed cell frequency bandwidth, wherein the radio base station determines the minimum frequency bandwidth threshold as a predetermined percentage of the unlicensed cell frequency bandwidth, or by the radio base station as a predetermined percentage of the unlicensed cell frequency bandwidth, wherein information on the determined minimum frequency bandwidth threshold is transmitted by the radio base station to the user equipment, and wherein the determined minimum frequency threshold is transmitted by the radio base station in a system information broadcast or in a message at the beginning of the random access procedure.

10. The method according to claim 1, further comprising the step of receiving by the user equipment an indication from the radio base station indicating which random access preamble sequence to select, and wherein the step of selecting the random access preamble sequence selects the indicated random access preamble sequence, or wherein the step of selecting is performed by the user equipment without an indication from the radio base station indicating which random access preamble sequence to select, and wherein a set of random access preamble sequences is divided into two subgroups and the user equipment selects the random access preamble sequence from one of the two subgroups depending on transmission resources necessary for transmitting by the user equipment a subsequent message of the random access procedure to the radio base station.

11. A radio base station for performing a random access procedure with a user equipment in a mobile communication system, wherein the user equipment is configured with at least one unlicensed cell, the random access procedure being performed via the unlicensed cell having an unlicensed cell frequency bandwidth, wherein a minimum frequency bandwidth threshold is defined for transmissions via the unlicensed cell, wherein a frequency bandwidth is determined for the user equipment to transmit the random access preamble sequence via the unlicensed cell, the determined frequency bandwidth being at least the minimum frequency bandwidth threshold, and wherein the radio base station comprises:

a receiver which, in operation, receives the random access preamble sequence, selected by the user equipment for the random access procedure, such that at least a determined frequency bandwidth of the unlicensed cell is occupied, the determined frequency bandwidth being at least the minimum frequency bandwidth threshold.

12. A user equipment for performing a random access procedure with a radio base station in a mobile communication system, wherein the user equipment is configured with at least one unlicensed cell, the random access procedure being performed via the unlicensed cell having an unlicensed cell frequency bandwidth, wherein a minimum frequency bandwidth threshold is defined for transmissions via the unlicensed cell, and wherein the user equipment comprises:

a processor which, in operation, selects a random access preamble sequence for the random access procedure, wherein the processor, in operation, determines a frequency bandwidth for transmitting the random access preamble sequence via the unlicensed cell, the determined frequency bandwidth being at least the minimum frequency bandwidth threshold, and a transmitter which, in operation, transmits the random access preamble sequence to the radio base station such that at least the determined frequency bandwidth of the unlicensed cell is occupied.

13. The user equipment according to claim 12, wherein a transmission of a random access preamble sequence via a licensed cell occupies a predetermined frequency bandwidth, wherein the transmitter, when transmitting the random access preamble sequence, repeats the transmission of the generated random access preamble sequence at different positions in the frequency domain so as to occupy at least the determined frequency bandwidth of the unlicensed cell, wherein the processor determines a number of repetitions necessary for occupying the determined frequency bandwidth of the unlicensed cell, the determination being based on the determined frequency bandwidth for transmitting the random access preamble sequence via the unlicensed cell and on the predetermined frequency bandwidth for transmitting the random access preamble sequence via the licensed cell, and wherein the repeated transmissions of the generated random access preamble sequence are adjacent in the frequency domain.

14. The user equipment according to claim 12, wherein the processor selects at least a second random access preamble sequence, different from the random access preamble sequence, and the transmitter transmits the at least second random access preamble sequence to the radio base station, wherein the transmitter, when transmitting the second random access preamble sequence, repeats the transmission of the second random access preamble sequence at different positions in the frequency domain, wherein the random access preamble sequence and the at least second random access preamble sequence are transmitted together such that at least the determined frequency bandwidth of the unlicensed cell is occupied, and wherein the second random access preamble sequence is selected based on an association between the second random access preamble sequence and the random access preamble sequence.

15. The user equipment according to claim 12, wherein the processor generates a set of random access preamble sequences available for performing the random access procedure via the unlicensed cell and via one of at least one licensed cell with which the user equipment is further configured, wherein the processor, when selecting the random access preamble sequence for the random access procedure, selects one random access preamble sequence from the generated set, and wherein, when performing a random access procedure via the licensed cell, the processor selects a third random access preamble sequence from the generated set, and the transmitter transmits the selected third random access preamble sequence via the licensed cell to the radio base station occupying a predetermined frequency bandwidth of the licensed cell.

16. The user equipment according to claim 12, wherein the transmitter performs the transmission of the random access preamble sequence with a length of the random access preamble sequence and a subcarrier frequency spacing for frequency subcarriers used for transmitting the random access preamble sequence such that the transmission of the random access preamble sequence occupies at least the determined frequency bandwidth, wherein the length of the random access preamble sequence corresponds to the number of frequency subcarriers used for transmitting the random access preamble sequence, and the frequency subcarriers used for transmitting the random access preamble sequence are spaced apart from each other by the subcarrier frequency spacing, wherein the subcarrier frequency spacing is an integer fraction of a subcarrier frequency spacing for frequency subcarriers used for transmitting a data channel, and wherein the processor determines the length of the random access preamble sequence and/or the subcarrier frequency spacing for the random access preamble sequence based on the minimum frequency bandwidth threshold.

17. The user equipment according to claim 16, wherein the processor generates a first set of random access preamble sequences for performing the random access procedure via the unlicensed cell, wherein the processor, when selecting the random access preamble sequence for the random access procedure, selects one random access preamble sequence of the generated set, wherein the processor generates a second set of random access preamble sequences for performing the random access procedure via one of at least one licensed cell with which the user equipment is further configured, and wherein, when performing a random access procedure via the at least one licensed cell, the processor selects a fourth random access preamble sequence from the second set, and the transmitter transmits the selected fourth random access preamble sequence via the licensed cell to the radio base station occupying a predetermined frequency bandwidth of the licensed cell.

18. The user equipment according to claim 16, wherein a transmission power is configured for transmitting random access preamble sequences via a licensed cell, and the transmission of the random access preamble via the unlicensed cell is performed either:

with the transmission power configured for transmitting random access preamble sequences via the licensed cell, or with a transmission power that is increased compared to the transmission power configured for transmitting random access preamble sequences via the licensed cell, wherein the increase of the transmission power is such that a power density over the determined frequency bandwidth stays the same as for the transmission of random access preamble sequences via the licensed cell.

19. The user equipment according to claim 12, further comprising a receiver which, in operation, receives an indication from the radio base station indicating which random access preamble sequence to select, wherein the processor, when selecting the random access preamble sequence for the random access procedure, selects the indicated random access preamble sequence, or the processor performs the selection of the random access preamble sequence for the random access procedure without an indication from the radio base station indicating which random access preamble sequence to select, wherein a set of random access preamble sequences is divided into two subgroups and the processor selects the random access preamble sequence from one of the two subgroups depending on transmission resources necessary for transmitting by the user equipment a subsequent message of the random access procedure to the radio base station.

20. The user equipment according to claim 12, further comprising a receiver which, in operation, receives from the radio base station a random access response message, including at least an uplink resource assignment, wherein the transmitter transmits a message to the radio base station, using the assigned uplink resources, and wherein the random access response message further includes one or more of:

a timing alignment instruction for the user equipment to synchronize uplink transmissions to the radio base station, a temporary identifier for the user equipment used for transmitting the message to the radio base station, and an identification of the random access preamble sequence transmitted by the user equipment to the radio base station.

* * * * *